US011945992B2

(12) United States Patent
Al-Yami

(10) Patent No.: US 11,945,992 B2
(45) Date of Patent: *Apr. 2, 2024

(54) POLYMER-BASED LATEX FOR DRILLING FLUIDS

(71) Applicant: Saudi Arabian Oil Company, Dhahran (SA)

(72) Inventor: Abdullah Saleh Hussain Al-Yami, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/880,950

(22) Filed: Aug. 4, 2022

(65) Prior Publication Data

US 2024/0052231 A1 Feb. 15, 2024

(51) Int. Cl.
*C09K 8/12* (2006.01)
*E21B 3/04* (2006.01)

(52) U.S. Cl.
CPC . *C09K 8/12* (2013.01); *E21B 3/04* (2013.01)

(58) Field of Classification Search
CPC .................................. C09K 8/12; E21B 3/04
See application file for complete search history.

(56) References Cited

U.S. PATENT DOCUMENTS

| | | | |
|---|---|---|---|
| 6,703,351 B2 | 3/2004 | Stowe et al. | |
| 8,020,618 B2 | 9/2011 | Veronique et al. | |
| 9,896,610 B2 | 2/2018 | Young et al. | |
| 10,556,829 B1 | 2/2020 | Reddy et al. | |
| 11,713,410 B1 * | 8/2023 | Al-Yami | C09K 8/46 166/293 |
| 2004/0044130 A1 * | 3/2004 | Labeau | C08F 290/062 525/64 |
| 2011/0272142 A1 | 11/2011 | Lewis et al. | |
| 2018/0127633 A1 * | 5/2018 | Burakowska-Meise | C12N 9/2437 |
| 2020/0071593 A1 | 3/2020 | Al-Yami et al. | |

FOREIGN PATENT DOCUMENTS

GB  2131067 A  *  6/1984  ............. C09K 8/035

OTHER PUBLICATIONS

Al-Yami et al., "Consideration to Batch Mixing Time Improves API Recommendation for Testing Cement Slurries and Prevents Cement Failures: Lab Testing and Field Application," SPE Kingdom of Saudi Arabia Annual Technical Symposium and Exhibition, Apr. 2017, 11 pages.
Al-Yami et al., "Development of New Retarder Systems To Mitigate Differential Cement Setting in Long Deep Liners," SPE/IADC Middle East Drilling Technology Conference & Exhibition, Oct. 2007, 15 pages.
Al-Yami et al., "Formation Damage Induced by Various Water-Based Fluids Used To Drill HP/HT wells," 2008 SPE International Symposium and Exhibition on Formation Damage Control, Feb. 2008, 30 pages.
Al-Yami et al., "Optimum practices to mitigate gas migration problems in deep gas wells, " SPE Russian Petroleum Technology Conference, Oct. 2017, 21 pages.
Al-Yami, "An Overview of Different Chemicals Used in Designing Cement Slurries for Oil and Gas Wells," SPE Kuwait Oil & Gas Show and Conference, Oct. 2015, 16 pages.
Baueregger, "Interaction of latex polymers with cement-based building materials," Thesis for the degree of Doctor of Science, Technical University of Munich, Oct. 2014, 278 pages.
Bensted, "Retardation of Cement Slurries to 250° F.," Offshore Europe Conference, Sep. 1991, 8 pages.
Brothers et al., "Synthetic Retarder for High-Strength Cements," SPE/IADC Drilling Conference, Mar. 1991, 7 pages.
Carico et al., "Description and Use of Polymers Used in Drilling, Workovers, and Completions," Society of Petroleum Engineers of AIME Production Technology Symposium, Oct. 1978, 10 pages.
Chandra et al., "Interactions of Polymers and Organic Admixtures on Portland Cement Hydration," Cement and Concrete Research, Nov. 1987, 17(6):875-890, 16 pages.
Chevalier et al., "Film formation with latex particles," Colloid and Polymer Science, Aug. 1992, 270(8):806-821, 17 pages.
Dean et al., "A Unique Gas Flow Model Reveals Insight to Predict Gas Migration in Cement," SPE Western Regional Meeting, Mar. 1992, 12 pages.
Dupriest et al., "Design Methodology and Operational Practices Eliminate Differential Sticking," SPE/IADC Drilling Conference, Feb. 2010, 9 pages.
Erkselius et al., "Drying rate variations of latex dispersions due to salt induced skin formation," Journal of Colloid and Interface Science, Jan. 2008, 317(1):83-95, 13 pages.
Fornasier et al., "Designing Environmentally Conforming Drilling Fluids: Challenges and Considerations in Latin America," SPE Latin America and Caribbean Petroleum Engineering Conference, May 2017, 8 pages.
Hestad et al., "Drilling Fluids Automix," SPE/IADC Middle East Drilling Technology Conference and Exhibition, Jan. 2018, 7 pages.
Hou et al., "Research of High Temperature Tolerance Latex Slurry System," Twentieth International Offshore and Polar Engineering Conference, Jun. 2010, 1 page.
Jenni et al., "Changes in microstructures and physical properties of polymer-modified mortars during wet storage," Cement and Concrete Research, Jan. 2006, 36(1):79-90, 12 pages.

(Continued)

*Primary Examiner* — Kumar R Bhushan
(74) *Attorney, Agent, or Firm* — Fish & Richardson P.C.

(57) ABSTRACT

A drilling fluid composition includes a latex including a first polymer and a second polymer. The first polymer includes polyvinyl alcohol and polyvinyl acetate. A molar concentration of the polyvinyl alcohol in the first polymer is greater than 80% and less than 100%. The second polymer has a general structure in which x is an overall molar ratio of styrene in the second polymer, y is an overall molar ratio of butadiene in the second polymer, and z is an overall molar ratio of carboxylic acid in the second polymer. A sum of x, y, and z is represented as s. Styrene (x) is in a range of from about 20% to about 30% of s. Butadiene (y) is in a range of from about 70% to about 80% of s. Carboxylic acid (z) is in a range of from about 1% to about 5% of s.

5 Claims, 21 Drawing Sheets

(56) References Cited

OTHER PUBLICATIONS

Jenni et al., "Influence of polymers on microstructure and adhesive strength of cementitious tile adhesive mortars," Cement and Concrete Research, Jan. 2005, 35(1):35-50, 16 pages.
Jennings et al., "Gas Migration After Cementing Greatly Reduced," SPE 13th Middle East Oil Show & Conference, Apr. 2003, 14 pages.
Jolicoeur et al., "Chemical Admixture-Cement Interactions: Phenomenology and Physico-chemical Concepts," Cement and Concrete Composites, 1998, 20(2-3):87-101, 15 pages.
Kardon, "Polymer-Modified Concrete: Review," Journal of Materials in Civil Engineering, May 1997, 9(2):85-92, 8 pages.
Keddie, "Film formation of latex," Materials Science and Engineering: R: Reports, Dec. 1997, 21(3) 101-170, 70 pages.
Kesalkar et al., "Effect of Poly Vinyl Acetate and Poly Vinyl Alcohol as Cement Admixture on Strength of Concrete," International Journal for Research in Applied Science & Engineering Technology, Jul. 2017, 5(VIII):41-47, 8 pages.
Li et al., "Styrene butadiene resin/nano-SiO2 composite as a water-and-oil-dispersible plugging agent for oil-based drilling fluid," Colloids and Surfaces A: Physicochemical and Engineering Aspects, Dec. 2020, 606:125245, 11 pages.
Lothenbach et al., "A Thermodynamic Approach to The Hydration of Sulphate-resisting Portland Cement," Waste Management, 2006, 26(7):706-719, 14 pages.
Lothenbach et al., "Effect of Temperature on The Pore Solution, microstructure and Hydration Products of Portland Cement Pastes," Cement and Concrete Research, Apr. 2007, 37(4):483-491, 9 pages.
Martins et al., "Tools for predicting and avoiding gas migration after casing cementing in Brazilian fields," Fifth Latin American and Caribbean Petroleum Conference and Exhibition, Aug.-Sep. 1997, 8 pages.
McCaskill et al., "Drilling Fluid System for Deep Drilling-An Interrelated Approach," 1972 Deep Drilling Symposium of the Society of Petroleum Engineers of AIME, Sep. 1972, 8 pages.
Navarrete et al., "Applications of Xanthan Gum in Fluid-Loss Control and Related Formation Damage," 2000 SPE Permian Basin Oil and Gas Recovery Conference, Mar. 2000, 21 pages.
Ohama, "Polymer-Based Admixtures," Cement and Concrete Composites, 1998, 20(2-3):189-212, 24 pages.
Outmans, "Mechanics of Differential Pressure Sticking of Drill Collars," Annual Fall Meeting of Southern California Petroleum Section, Oct. 1957, 218, 10 pages.
Plank et al., "Study on the interaction between anionic and cationic latex particles and Portland cement," Colloids and Surfaces A: Physicochemical and Engineering Aspects, Dec. 2008, 330(2-3):227-233, 7 pages.
Routh et al., "A process model for latex film formation: limiting regimes for individual driving forces," Langmuir, Aug. 1999, 15(22):7762-7773, 12 pages.
Sultan, "Study the Influence of Poly Vinyl Acetate on Flow Behavior of Bentonite Dispersions in Water," Engineering and Technology Journal, 2009, 27(4): 799-808, 10 pages.
Sykes et al., "New Technology In Gas Migration Control," 62nd Annual Technical Conference and Exhibition of the Society of Petroleum Engineering, Sep. 1987, 6 pages.
Talabani et al., "Gas Migration Eliminated Through Correct Cement Design Including Elastomers," SPE/IADC Middle East Drilling Technology Conference, Nov. 1997, 6 pages.
Talabani, "Can cement log be better managed and analyzed," 11th Abu Dhabi International Petroleum Exhibition and Conference, Oct. 2004, 10 pages.
Voxkanyan, "Glue Compositions Based on Polyvinyl Acetate and Its Derivatives," Polymer Science. Series D, May 2009, 2(2):92-96, 5 pages.
Wang et al., "Influence of polymer on cement hydration in SBR modified cement pastes," Cement and Concrete Research, Sep. 2006, 36(9):1744-1751, 8 pages.
Wang et al., "Mechanism analysis and effect of styrene-acrylate copolymer powder on cement hydrates," Construction and Building Materials, Apr. 2013, 41:538-544, 7 pages.

* cited by examiner

POLYMER-BASED LATEX FOR DRILLING FLUIDS

TECHNICAL FIELD

This disclosure relates to drilling fluids.

BACKGROUND

Natural resources such as gas, oil, and water in a subterranean formation can be produced by drilling a wellbore into the subterranean formation while circulating a drilling fluid in the wellbore. Drilling fluids are used in oil and gas drilling to assist with lubricating the drill bit, ensuring well safety, forming filter cakes to minimize fluid loss into drilling formations, and transporting rock debris to the surface of the well. Some of the functions of a drilling fluid include suspending drill cuttings (for example, while drilling is paused or while the drilling assembly is brought in and out of the hole), carrying drill cuttings out of the hole, providing hydrostatic pressure to prevent formation fluids from entering the wellbore while it is being drilled, and keeping the drill bit cool and clean while drilling. Three exemplary types of drilling fluids include water-based muds, non-aqueous muds (such as oil-based muds), and gaseous drilling fluids.

SUMMARY

This disclosure describes technologies relating to drilling fluids, and in particular, polymer-based latexes for use in drilling fluids. Certain aspects of the subject matter described can be implemented as a drilling fluid composition. The drilling fluid composition includes a latex. The latex includes a first polymer and a second polymer dispersed in water. The first polymer includes polyvinyl alcohol and polyvinyl acetate. A molar concentration of the polyvinyl alcohol in the first polymer is greater than 80% and less than 100%. The second polymer is derived from styrene, butadiene, and a carboxylic acid. The second polymer has the general structure:

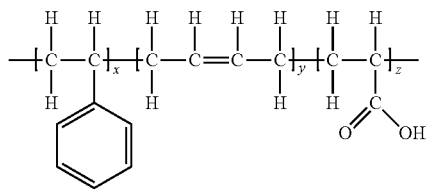

where x is an overall molar ratio of styrene in the second polymer, y is an overall molar ratio of butadiene in the second polymer, and z is an overall molar ratio of carboxylic acid in the second polymer. A sum of x, y, and z is represented as s. Styrene (x) is in a range of from about 20% to about 30% of s. Butadiene (y) is in a range of from about 70% to about 80% of s. Carboxylic acid (z) is in a range of from about 1% to about 5% of s.

This, and other aspects, can include one or more of the following features. In some implementations, the drilling fluid composition includes an additive. The additive can include at least one of soda ash, xanthan gum, a cellulosic polymer, a starch, a hydrolyzed polyacrylamide polymer, a salt, a sulfate mineral, caustic soda, or sodium sulfide. In some implementations, a molar ratio of the first polymer to the second polymer in the drilling fluid composition is about 1:1. In some implementations, a combined concentration of the first polymer and the second polymer in the drilling fluid composition is in a range of from about 0.1 volume percent (vol. %) to about 10 vol. %. In some implementations, the combined concentration of the first polymer and the second polymer in the drilling fluid composition is in a range of from 2.4 vol. % to 4.8 vol. %. In some implementations, the molar concentration of the polyvinyl alcohol in the first polymer is about 88%.

Certain aspects of the subject matter described can be implemented as a method. A first polymer is formed. The first polymer includes polyvinyl alcohol and polyvinyl acetate. Forming the first polymer includes mixing calcium hydroxide and water to form a first mixture. Forming the first polymer includes adding polyvinyl acetate to the first mixture to form a second mixture. Forming the first polymer includes stirring the second mixture for a first specified time duration sufficient to hydrolyze at least a portion of the polyvinyl acetate into polyvinyl alcohol and form the first polymer. A molar concentration of the polyvinyl alcohol in the first polymer is greater than 80% and less than 100%. A second polymer is formed. Forming the second polymer includes mixing citric acid and water to form a third mixture. Forming the second polymer includes adding a styrene-butadiene polymer to the third mixture to form a fourth mixture. Forming the second polymer includes stirring the fourth mixture for a second specified time duration sufficient for carboxylation of the styrene-butadiene to occur and form the second polymer. The second polymer has the general structure:

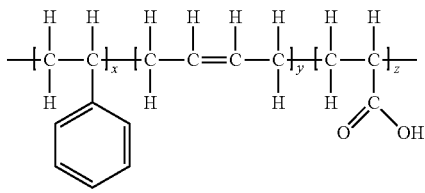

where x is an overall molar ratio of styrene in the second polymer, y is an overall molar ratio of butadiene in the second polymer, and z is an overall molar ratio of carboxylic acid in the second polymer. A sum of x, y, and z is represented as s. Styrene (x) is in a range of from about 20% to about 30% of s. Butadiene (y) is in a range of from about 70% to about 80% of s. Carboxylic acid (z) is in a range of from about 1% to about 5% of s. The first polymer and the second polymer are mixed with an additive to form a drilling fluid.

This, and other aspects, can include one or more of the following features. The additive can include at least one of soda ash, xanthan gum, a cellulosic polymer, a starch, a hydrolyzed polyacrylamide polymer, a salt, a sulfate mineral, caustic soda, or sodium sulfide. In some implementations, a molar ratio of the first polymer to the second polymer in the drilling fluid is about 1:1. In some implementations, a combined concentration of the first polymer and the second polymer in the drilling fluid is in a range of from about 0.1 vol. % to about 10 vol. %. In some implementations, the combined concentration of the first polymer and the second polymer in the drilling fluid is in a range of from 2.4 vol. % to 4.8 vol. %. In some implementations, the molar concentration of the polyvinyl alcohol in the first polymer is about 88%.

Certain aspects of the subject matter described can be implemented as a method. A drill bit is rotated to cut into a subterranean formation, thereby forming a wellbore in the subterranean formation. A drilling fluid is circulated around the drill bit and through the wellbore as the drill bit rotates. The drilling fluid includes a latex. The latex includes a first polymer and a second polymer. The first polymer includes polyvinyl alcohol and polyvinyl acetate. A molar concentration of the polyvinyl alcohol in the first polymer is greater than 80% and less than 100%. The second polymer is derived from styrene, butadiene, and a carboxylic acid. The second polymer has the general structure:

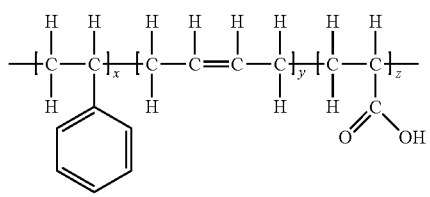

where x is an overall molar ratio of styrene in the second polymer, y is an overall molar ratio of butadiene in the second polymer, and z is an overall molar ratio of carboxylic acid in the second polymer. A sum of x, y, and z is represented as s. Styrene (x) is in a range of from about 20% to about 30% of s. Butadiene (y) is in a range of from about 70% to about 80% of s. Carboxylic acid (z) is in a range of from about 1% to about 5% of s.

This, and other aspects, can include one or more of the following features. In some implementations, the drilling fluid includes an additive. The additive can include at least one of soda ash, xanthan gum, a cellulosic polymer, a starch, a hydrolyzed polyacrylamide polymer, a salt, a sulfate mineral, caustic soda, or sodium sulfide. In some implementations, a molar ratio of the first polymer to the second polymer in the drilling fluid is about 1:1. In some implementations, a combined concentration of the first polymer and the second polymer in the drilling fluid is in a range of from about 0.1 volume percent (vol. %) to about 10 vol. %. In some implementations, the combined concentration of the first polymer and the second polymer in the drilling fluid is in a range of from 2.4 vol. % to 4.8 vol. %. In some implementations, the molar concentration of the polyvinyl alcohol in the first polymer is about 88%.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

This disclosure describes polymer-based latexes for use in drilling fluids. A polymer-based latex is a stable, aqueous colloidal dispersion of polymer particles. In some implementations, the polymer particles have an average particle diameter in a range of from about 10 nanometers (nm) to about 1,000 nm. A polymer-based latex can include additional components, such as monomers, oligomers, surfactants, viscosifiers, weighting agents, and other additives. Polymer-based latexes can prepare a thin filter cake on a wellbore formation and reduce filtrate loss into the formation.

The subject matter described in this disclosure can be implemented in particular implementations, so as to realize one or more of the following advantages. The polymer-based latexes described can be included in drilling fluids to reduce and/or eliminate the potential of differential sticking of a tubular (such as a drill pipe) in the wellbore, which can incur steep operational costs, as differential sticking can cause delays in drilling and in completing the well on time to meet expected production rates. The polymer-based latexes described can be included in drilling fluids to reduce and/or eliminate the potential of fluid channeling while drilling. The polymer-based latexes described can be included in drilling fluids to form thin-film barriers which can reduce and/or eliminate the potential of formation of micro-annuli while drilling, reduce and/or eliminate fluid invasion while drilling, and improve recovery factor from shale. The polymer-based latexes described can be included in drilling fluids to reduce pore pressure transmission by internally bridging pore throats of low permeability sand and shale micro-fractures. Because the polymer-based latexes described include deformable colloidal particles, the polymer-based latexes can bridge at borehole interfaces of a low permeability formation and form an internal cake, which can also contribute to external filter cake quality. Such bridging and filter cake formation can increase the window between pore pressure and fracture pressure, thereby allowing the drilling of a depleted zone without inducing losses. The polymer-based latexes described can be included in drilling fluids to reduce and/or eliminate filtration losses while drilling. The polymer-based latexes described can be included in drilling fluids to improve viscosity of the drilling fluids. The polymer-based latexes described can be included in drilling fluids to stabilize a shale formation, which can subsequently improve hydrocarbon recovery from the shale formation. The polymer-based latexes described can be included in drilling fluids to stabilize a shale formation by promoting hydrogen bonding, which can facilitate shale layers to combine together and prevent them from separating from each other and breaking. The polymer-based latexes described can be included in drilling fluids to improve subsequent well performance and production.

Figure 1:
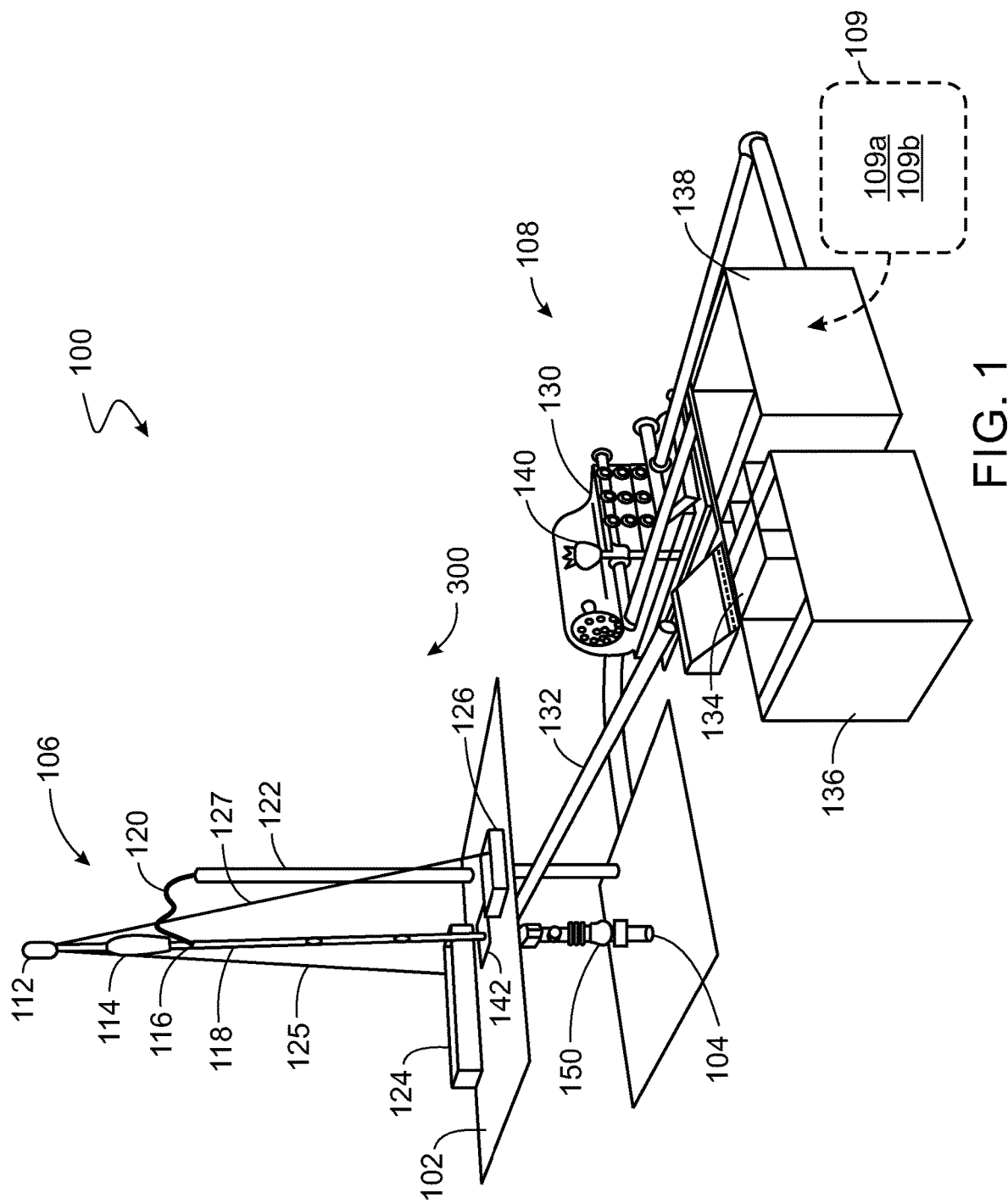
FIG. 1 is a schematic diagram of an example wellbore being drilled in a subterranean formation.

FIG. 1 is a partial schematic perspective view of an example rig system 100 for drilling and producing a well. The well can extend from the surface through the Earth to one or more subterranean zones of interest. The example rig system 100 includes a drill floor 102 positioned above the surface, a wellhead 104, a drill string assembly 106 supported by the rig structure, and a fluid circulation system 108 to filter used drilling fluid 109 from the wellbore and provide clean drilling fluid 109 to the drill string assembly 106. For example, the example rig system 100 of FIG. 1 is shown as a drill rig capable of performing a drilling operation with the rig system 100 supporting the drill string assembly 106 over a wellbore. The wellhead 104 can be used to support casing or other well components or equipment into the wellbore of the well. The example wellhead assembly 104 can take a variety of forms and include a number of different components. For example, the wellhead assembly 104 can include additional or different components than the example shown in FIG. 1. Similarly, the circulation system 108 can include additional or different components than the example shown in FIG. 1.

The derrick or mast is a support framework mounted on the drill floor 102 and positioned over the wellbore to support the components of the drill string assembly 106 during drilling operations. A crown block 112 forms a longitudinally-fixed top of the derrick, and connects to a travelling block 114 with a drilling line including a set of wire ropes or cables. The crown block 112 and the travelling block 114 support the drill string assembly 106 via a swivel 116, a kelly 118, or a top drive system (not shown). Longitudinal movement of the travelling block 114 relative to the crown block 112 of the drill string assembly 106 acts to move the drill string assembly 106 longitudinally upward and downward. The swivel 116, connected to and hung by the travelling block 114 and a rotary hook, allows free rotation of the drill string assembly 106 and provides a connection to a kelly hose 120, which is a hose that flows drilling fluid 109 from a drilling fluid supply of the circulation system 108 to the drill string assembly 106. A standpipe 122 mounted on the drill floor 102 guides at least a portion of the kelly hose 120 to a location proximate to the drill string assembly 106. The kelly 118 is a hexagonal device suspended from the swivel 116 and connected to a longitudinal top of the drill string assembly 106, and the kelly 118 turns with the drill string assembly 106 as the rotary table 142 of the drill string assembly turns.

In the example rig system 100 of FIG. 1, the drill string assembly 106 is made up of drill pipes with a drill bit (not shown) at a longitudinally bottom end of the drill string. The drill pipe can include hollow steel piping, and the drill bit can include cutting tools, such as blades, discs, rollers, cutters, or a combination of these, to cut into the formation and form the wellbore. The drill bit rotates and penetrates through rock formations below the surface under the combined effect of axial load and rotation of the drill string assembly 106. In some implementations, the kelly 118 and swivel 116 can be replaced by a top drive that allows the drill string assembly 106 to spin and drill. The wellhead assembly 104 can also include a drawworks 124 and a deadline anchor 126, where the drawworks 124 includes a winch that acts as a hoisting system to reel the drilling line in and out to raise and lower the drill string assembly 106 by a fast line 125. The deadline anchor 126 fixes the drilling line opposite the drawworks 124 by a deadline 127, and can measure the suspended load (or hook load) on the rotary hook. The weight on bit (WOB) can be measured when the drill bit is at the bottom the wellbore. The wellhead assembly 104 also includes a blowout preventer 150 positioned at the surface 101 of the well and below (but often connected to) the drill floor 102. The blowout preventer 150 acts to prevent well blowouts caused by formation fluid entering the wellbore, displacing drilling fluid 109, and flowing to the surface at a pressure greater than atmospheric pressure. The blowout preventer 150 can close around (and in some instances, through) the drill string assembly 106 and seal off the space between the drill string and the wellbore wall. The blowout preventer 150 is a valve (or assembly of valves) at the top of the well that can be closed to seal the well to prevent a blowout, which is an uncontrolled release of formation fluid from the well.

During a drilling operation of the well, the circulation system 108 circulates drilling fluid 109 from the wellbore to the drill string assembly 106, filters used drilling fluid 109 from the wellbore, and provides clean drilling fluid 109 to the drill string assembly 106. The example circulation system 108 includes a fluid pump 130 that fluidly connects to and provides drilling fluid 109 to drill string assembly 106 via the kelly hose 120 and the standpipe 122. The circulation system 108 also includes a flow-out line 132, a shale shaker 134, a settling pit 136, and a suction pit 138. In a drilling operation, the circulation system 108 pumps drilling fluid 109 from the surface, through the drill string assembly 106, out the drill bit and back up the annulus of the wellbore, where the annulus is the space between the drill pipe and the formation or casing. The density of the drilling fluid 109 is intended to be greater than the formation pressures to prevent formation fluids from entering the annulus and flowing to the surface and less than the mechanical strength of the formation, as a greater density may fracture the formation, thereby creating a path for the drilling fluid 109 to go into the formation. Apart from well control, drilling fluid 109 can also cool the drill bit and lift rock cuttings from the drilled formation up the annulus and to the surface to be filtered out and treated before it is pumped down the drill string assembly 106 again. The drilling fluid 109 returns in the annulus with rock cuttings and flows out to the flow-out line 132, which connects to and provides the fluid to the shale shaker 134. The flow line is an inclined pipe that directs the drilling fluid 109 from the annulus to the shale shaker 134. The shale shaker 134 includes a mesh-like surface to separate the coarse rock cuttings from the drilling fluid 109, and finer rock cuttings and drilling fluid 109 then go through the settling pit 136 to the suction pit 136. The circulation system 108 includes a mud hopper 140 into which materials (for example, to provide dispersion, rapid hydration, and uniform mixing) can be introduced to the circulation system 108. The fluid pump 130 cycles the drilling fluid 109 up the standpipe 122 through the swivel 116 and back into the drill string assembly 106 to go back into the well.

The drilling fluid 109 includes a latex, which is a polymer dispersed in water. In some implementations, the drilling fluid 109 includes a first polymer 109a dispersed in water. The first polymer 109a includes polyvinyl alcohol and polyvinyl acetate. In some implementations, the first polymer 109a is a partially hydrolyzed polyvinyl acetate. In some implementations, a molar concentration of the polyvinyl alcohol in the first polymer 109a is greater than 80% and less than 100%. For example, the molar concentration of the polyvinyl alcohol in the first polymer 109a is in a range of from about 80% to about 90%, from about 85% to about 95%, or from about 85% to about 90%. For example, the molar concentration of the polyvinyl alcohol in the first polymer 109a is about 88%.

In some implementations, the drilling fluid 109 includes a second polymer 109b dispersed in water. The second polymer 109b is derived from styrene, butadiene, and a carboxylic acid (for example, acrylic acid or methacrylic acid). In some implementations, the second polymer 109b has the following general structure:

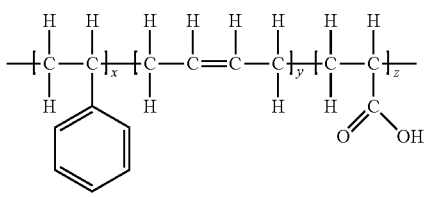

where x is an overall molar ratio of styrene in the second polymer 109b, y is an overall molar ratio of butadiene in the second polymer 109b, and z is an overall molar ratio of carboxylic acid in the second polymer 109b. A sum of x, y, and z can be represented as s. In some implementations, x (styrene) is in a range of from about 20% to about 30% of s. In some implementations, y (butadiene) is in a range of from about 70% to about 80% of s. In some implementations, z (carboxylic acid) is in a range of from about 1% to about 5% of s. In some implementations, a ratio of x (styrene) toy (butadiene) is in a range of from about 0.22:1 to about 1:0.22.

In some implementations, the drilling fluid 109 includes both the first polymer 109a and the second polymer 109b. In some implementations, a molar ratio of the first polymer 109a to the second polymer 109b in the drilling fluid 109 is in a range of from about 1:2 to about 2:1. For example, the molar ratio of the first polymer 109a to the second polymer 109b in the drilling fluid 109 is about 1:1. In some implementations, a combined concentration of the first polymer 109a and the second polymer 109b in the drilling fluid 109 is in a range of from about 0.1 volume percent (vol. %) to about 10 vol. %. For example, the combined concentration of the first polymer 109a and the second polymer 109b in the drilling fluid 109 can be in a range of from about 2.4 vol. % to about 4.8 vol. %. The drilling fluid 109 can include additional components, such as additives. Some non-limiting examples of additives that can be included in the drilling fluid 109 (either individually or in combination) include soda ash, xanthan gum, cellulosic polymer, starch, hydrolyzed polyacrylamide polymer, salt, sulfate mineral, caustic soda, and sodium sulfide.

Figure 2A:
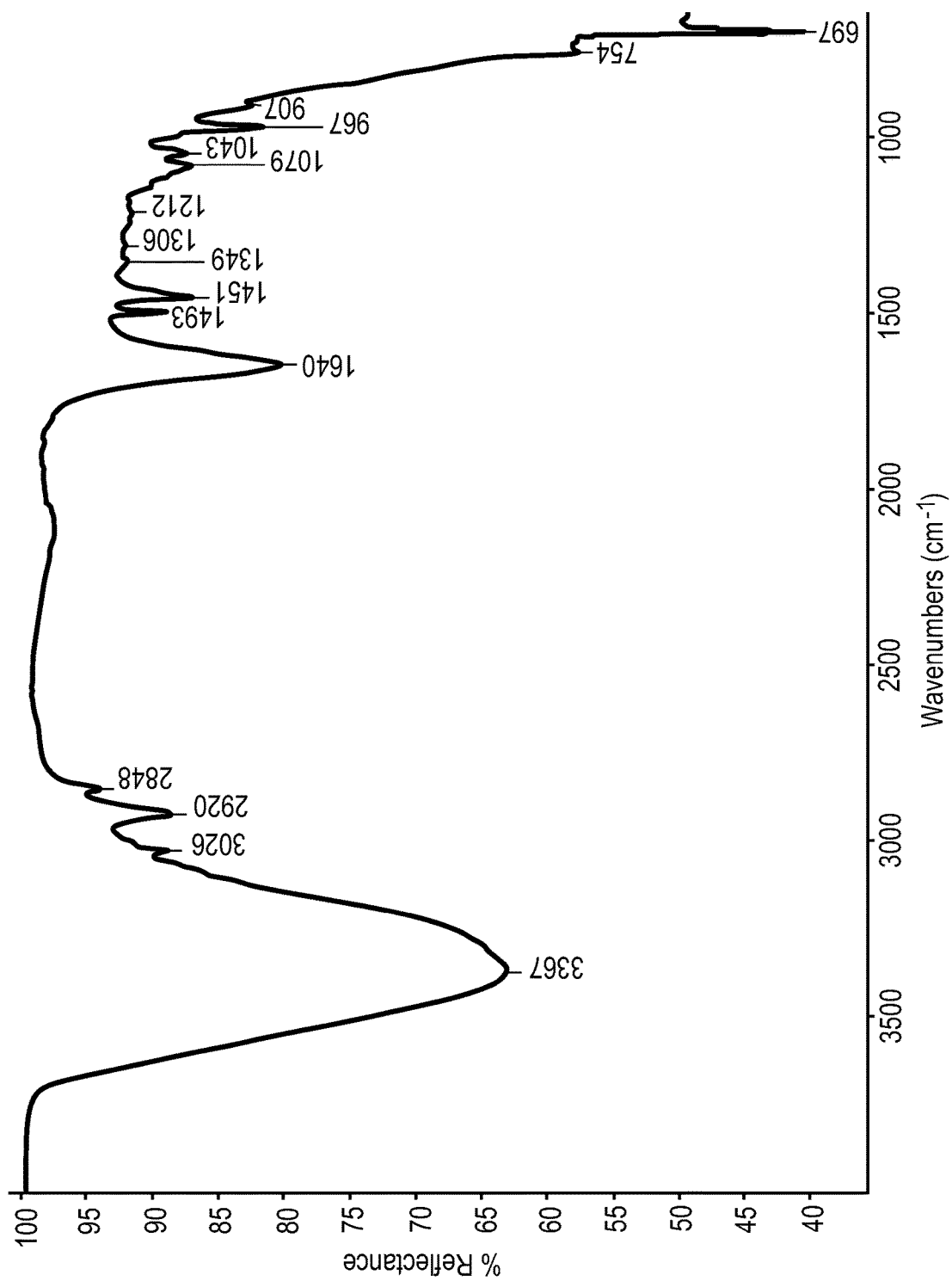
FIG. 2A is an infrared spectrum of an example polymer that can be included in a latex for a drilling fluid.

FIG. 2A is an infrared spectrum of an example polymer that can be included in a latex for a drilling fluid. The infrared spectrum shown in FIG. 2A was obtained using a Varian Fourier transform infrared (FTIR) spectrophotometer equipped with a mercury cadmium telluride (MCT) detector and Golden gate accessory with an average of 128 scans at a resolution of 4 per centimeter ($cm^{-1}$). The example polymer whose infrared spectrum is shown in FIG. 2A was a carboxylated styrene butadiene polymer (for example, an implementation of the second polymer 109b) that was dried at about 105 degrees Celsius (° C.) for about 2 hours to remove water content. The infrared spectrum (in percent reflectance) shown in FIG. 2A shows the presence of a carboxyl group at wavenumber 1640 inverse centimeters ($cm^{-1}$). The largest peak of the infrared spectrum shown in FIG. 2A corresponds to the oxygen-hydrogen bond (hydroxyl group) vibration at wavenumber 3367 $cm^{-1}$.

Figure 2B:
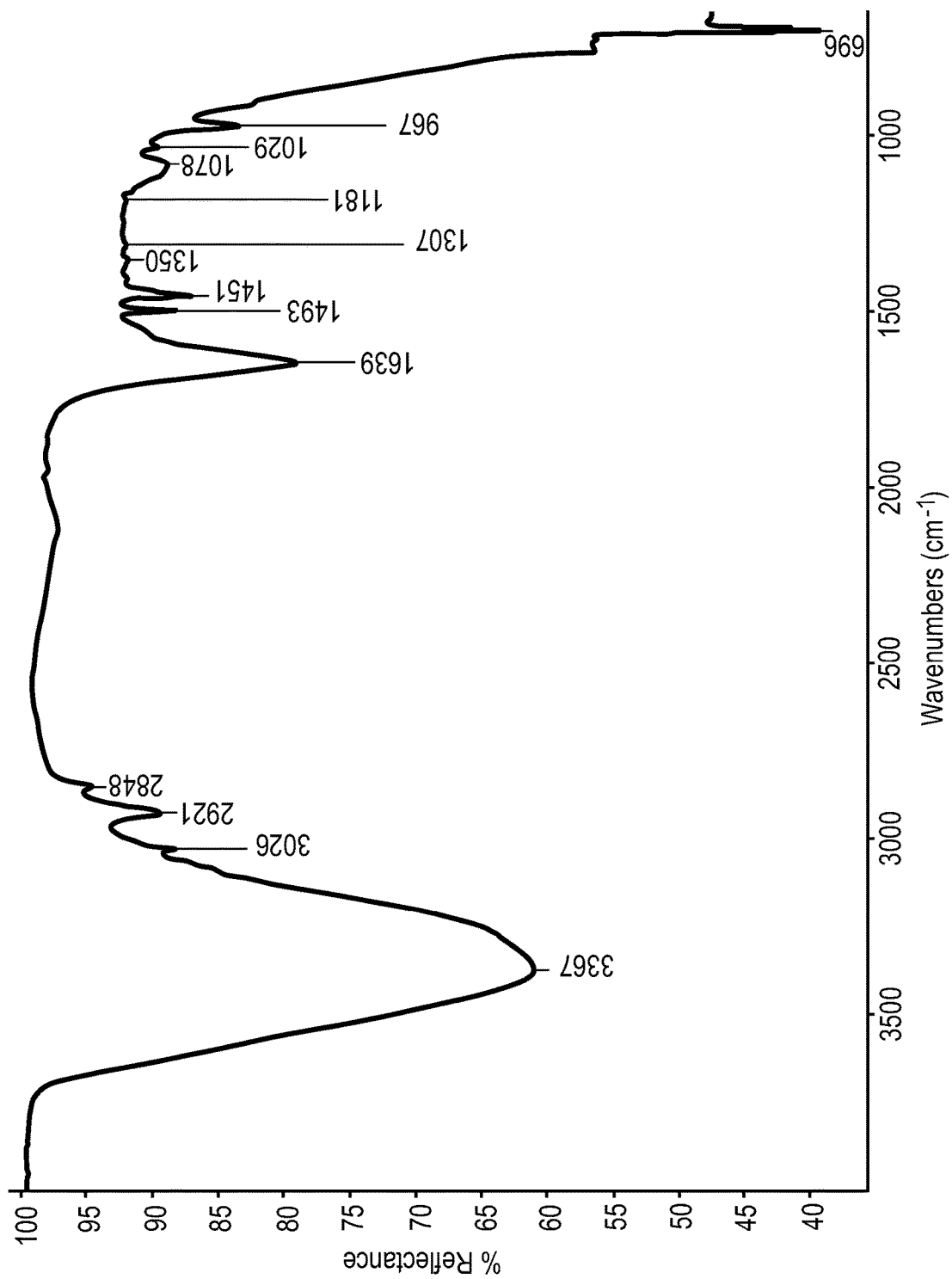
FIG. 2B is an infrared spectrum of an example polymer that can be included in a latex for a drilling fluid.

FIG. 2B is an infrared spectrum of an example polymer that can be included in a latex for a drilling fluid. The infrared spectrum shown in FIG. 2B was also obtained using the Varian FTIR spectrophotometer. The example polymer whose infrared spectrum is shown in FIG. 2B was a carboxylated styrene butadiene polymer (for example, an implementation of the second polymer 109b) that was dried at about 105° C. for about 2 hours to remove water content. The infrared spectrum (in percent reflectance) shown in FIG. 2B also shows the presence of the carboxyl group, the hydroxyl group, and mono-substituted aromatics peaks at wavenumbers 696 $cm^{-1}$ and 3026 $cm^{-1}$, respectively.

Figure 2C:
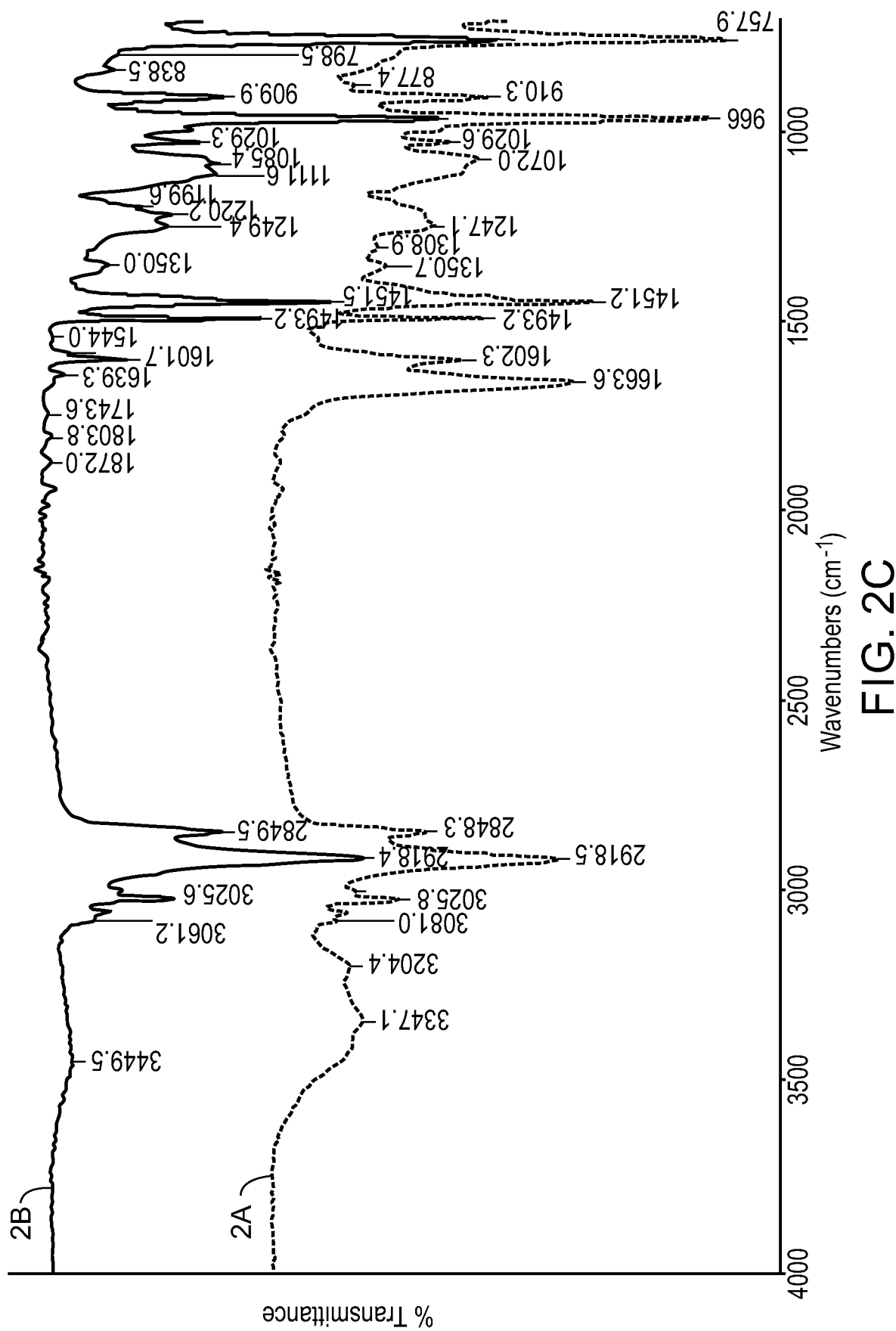
FIG. 2C shows infrared spectra of example polymers that can be included in a latex for a drilling fluid.
Figure 2D:
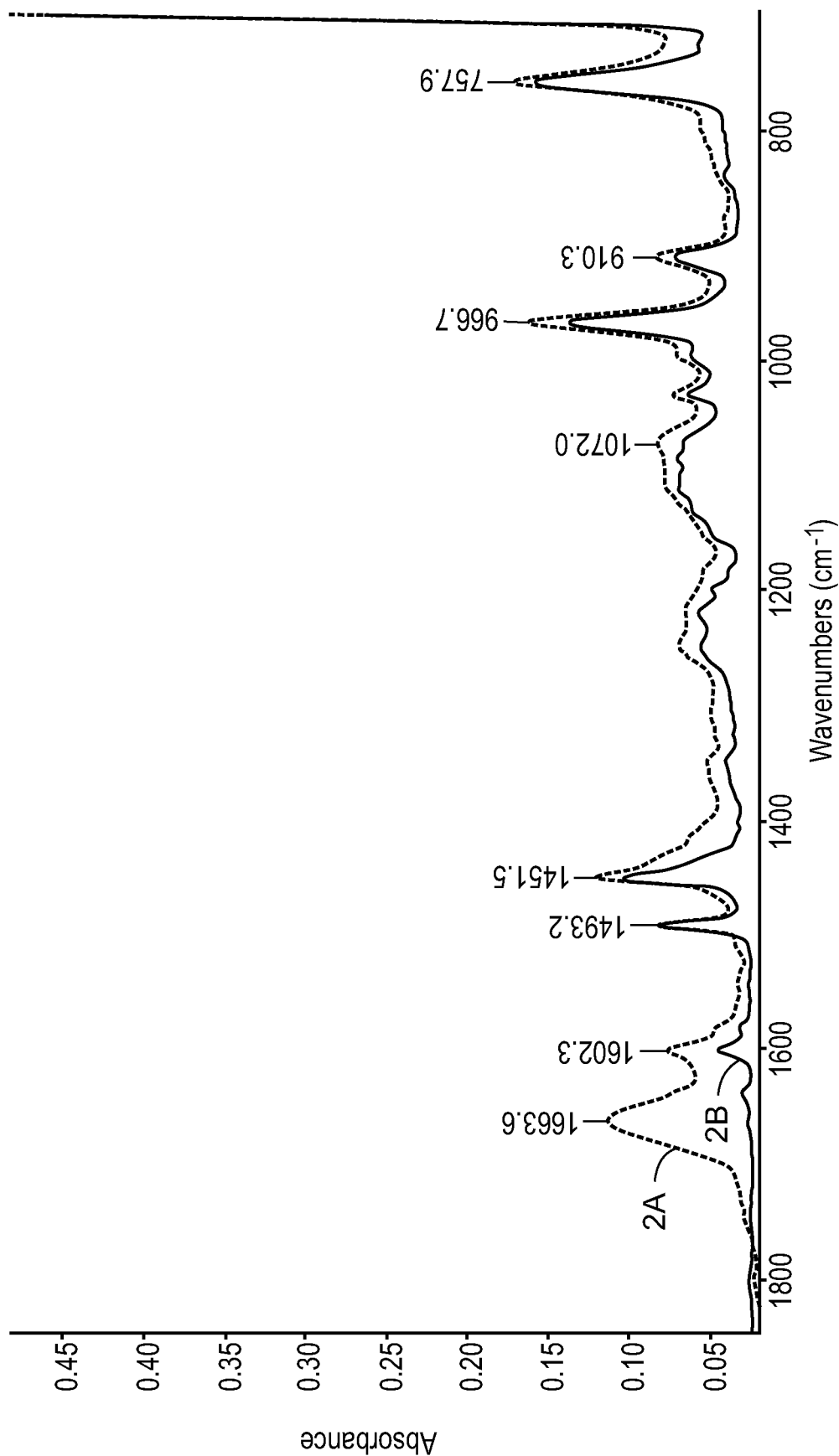
FIG. 2D is an absorbance spectrum of example polymers that can be included in a latex for a drilling fluid.

FIG. 2C shows infrared spectra in percent transmittance of the example polymers of FIGS. 2A and 2B. FIG. 2D shows absorbance spectra of the example polymers of FIGS. 2A and 2B. The infrared spectra shown in FIG. 2C and the absorbance spectra shown in FIG. 2D were also obtained using the Varian FTIR spectrophotometer and provide a comparison of the locations of polystyrene and polybutadiene in the example polymers. The infrared spectra shown in FIG. 2C and the absorbance spectra shown in FIG. 2D reveal that the example polymer of FIG. 2A included slightly more butadiene and styrene in comparison to the example polymer of FIG. 2B.

Figure 2E:
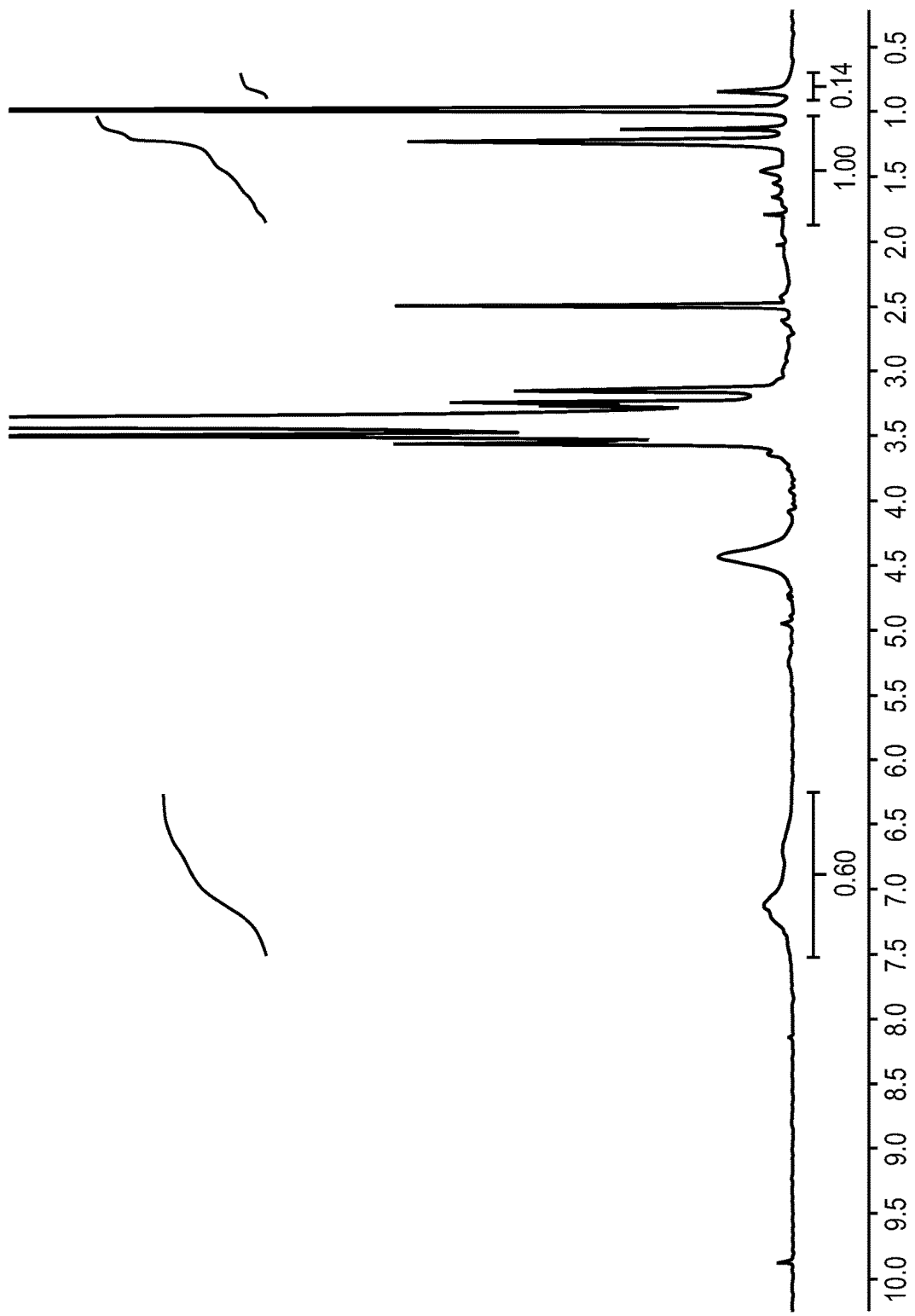
FIG. 2E is a proton nuclear magnetic resonance (1H NMR) spectrum of an example polymer that can be included in a latex for a drilling fluid.

FIG. 2E is a proton nuclear magnetic resonance (1H NMR) spectrum of the example polymer of FIG. 2A. The 1H NMR spectrum shown in FIG. 2E was obtained using an NMR spectrometer applying NMR with respect to hydrogen-1 nuclei within the molecules of the polymer in order to determine the structure of the polymer. A solvent (DMSO) was used to reveal the hydrogen-1 nuclei from the polymer. The 1H NMR spectrum shown in FIG. 2E shows a peak in the 0.8-1.2 parts per million (ppm) range for butadiene and a peak in the 6.5-8 ppm range for styrene. The example polymer of FIG. 2A had a ratio of butadiene to styrene in the polymer of 1:0.53.

Figure 2F:
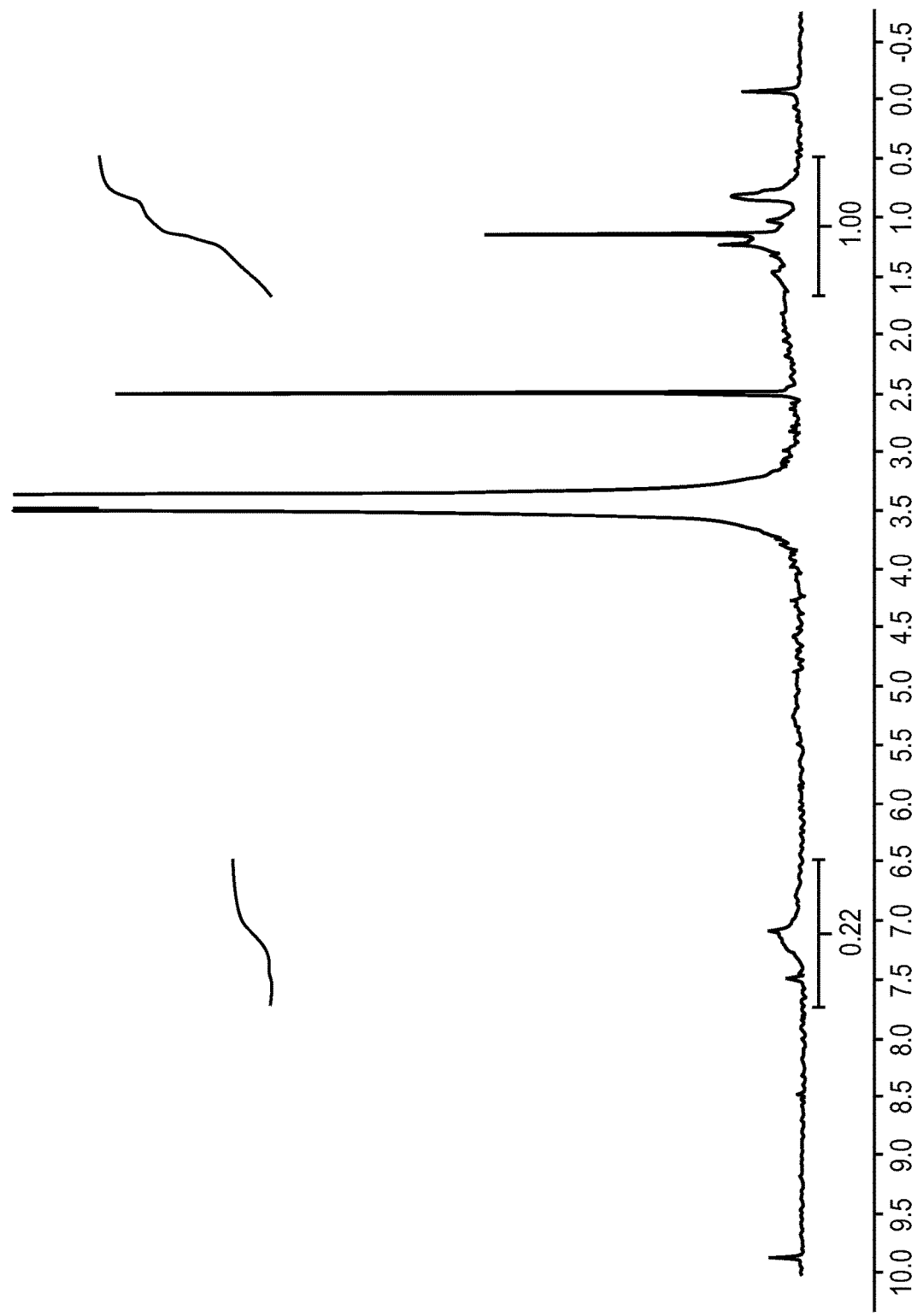
FIG. 2F is a 1H NMR spectrum of an example polymer that can be included in a latex for a drilling fluid.

FIG. 2F is a 1H NMR spectrum of the example polymer of FIG. 2B. The 1H NMR spectrum shown in FIG. 2F was also obtained using the NMR spectrometer. A solvent (DMSO) was used to reveal the hydrogen-1 nuclei from the polymer. The 1H NMR spectrum shown in FIG. 2F shows a peak in the 0.8-1.2 ppm range for butadiene and a peak in the 6.5-8 ppm range for styrene. The example polymer of FIG. 2B had a ratio of butadiene to styrene in the polymer of 1:0.22.

Figure 2G:
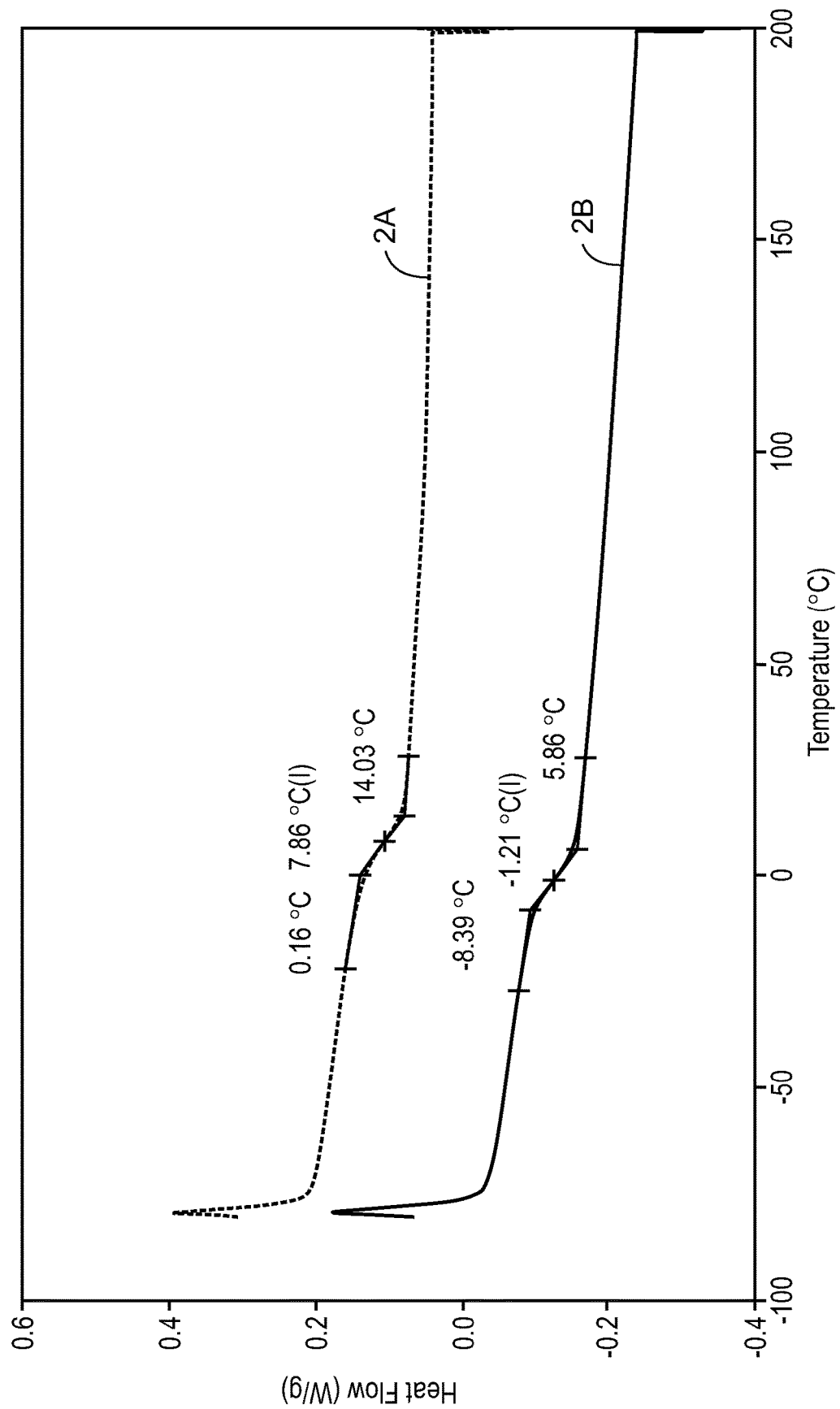
FIG. 2G is a differential scanning calorimetry (DSC) thermogram of example polymers that can be included in a latex for a drilling fluid.

FIG. 2G shows differential scanning calorimetry (DSC) thermograms of the example polymers of FIGS. 2A and 2B. The DSC thermograms shown in FIG. 2G were obtained using a differential scanning calorimeter (DSC Q20), which was coupled to a refrigerated cooling system. The differential scanning calorimeter scanned running at a heating rate of 20 degrees Celsius per minute (° C./min) under a nitrogen purge rate of 20 cubic centimeters per minute ($cm^3$/min) between room temperature to 200° C. The DSC thermograms were obtained from a second heating process (after cooling) at a heating rate of 20° C./min. The example polymer of FIG. 2A exhibited a glass transition temperature of −1.21° C., while the example polymer of FIG. 2B exhibited a glass transition temperature of 7.86° C. The lower glass transition temperature of the example polymer of FIG. 2A may be attributed to the greater content of butadiene present in the example polymer of FIG. 2A in comparison to the example polymer of FIG. 2B.

Figure 2H:
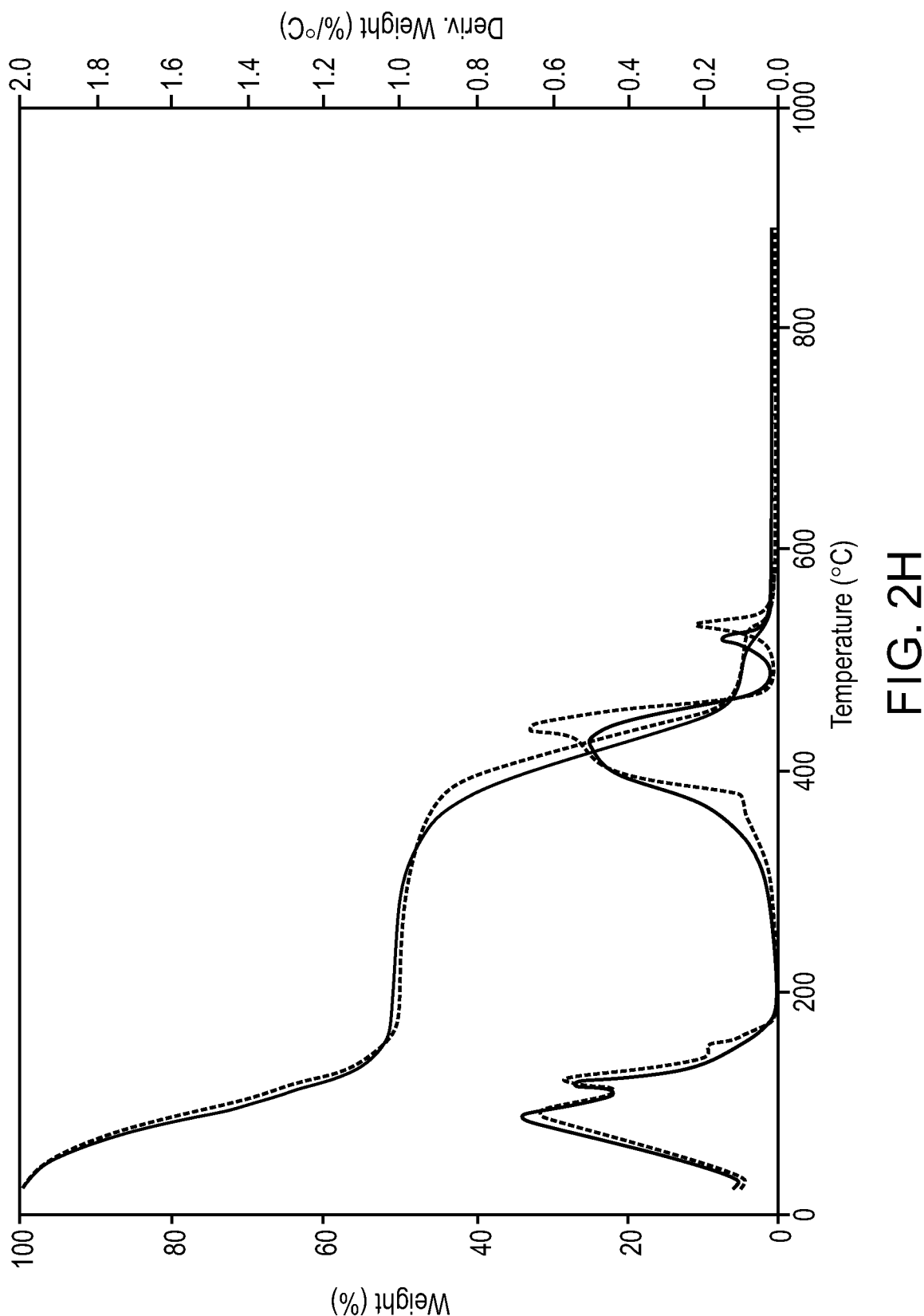
FIG. 2H is a thermogravimetric analysis (TGA) thermogram of example polymers that can be included in a latex for a drilling fluid.

FIG. 2H shows thermogravimetric analysis (TGA) thermograms of the example polymers of FIGS. 2A and 2B. The TGA thermograms shown in FIG. 2H were obtained using a thermal gravimetric analyzer (TGA Q500) that was programmed to provide a heating rate of 10° C./min between 25° C. to 900° C. at atmospheric pressure to determine weight loss of a sample over a specified temperature range. Both example polymers of FIGS. 2A and 2B experienced a weight loss of about 50% at a decomposition temperature range of 25-250° C. due to the presence of water and other additives. For a decomposition temperature range of 250-600° C., the example polymer of FIG. 2A experienced the hottest decomposition temperature of 438° C., while the example polymer of FIG. 2B experienced the hottest decomposition temperature of 425° C. It is generally known that polybutadiene decomposes at a hotter temperature in comparison to polystyrene. In comparison to the example polymer of FIG. 2B, the example polymer of FIG. 2A exhibited taller peaks for polybutadiene and polystyrene. Table 1 provides a summary of results of the TGA and DSC analyses.

TABLE 1

Summary of TGA and DSC analyses for example polymers of FIGS. 2A and 2B

TGA Analysis

| Label | Air atmosphere | | Nitrogen atmosphere | |
| --- | --- | --- | --- | --- |
| | 2A | 2B | 2A | 2B |
| Volatiles (wt. %) | 50.1 | 49.4 | 50.1 | 48.8 |
| SBR (wt. %) | 49.3 | 49.3 | 49.3 | 49.6 |
| Residue (wt. %) | 0.6 | 1.3 | 0.4 | 1.1 |
| $T_{max}$ (° C.) | 438.1 | 425.5 | 438.1 | 425.5 |

DSC Analysis

| | | |
| --- | --- | --- |
| $T_{start}$ (° C.) | −8.4 | 0.2 |
| $T_{mid}$ (° C.) | −1.2 | 7.9 |
| $T_{end}$ (° C.) | 5.9 | 14 |

The potential of hydrogen (pH) was measured for each of the example polymers of FIGS. 2A and 2B. In a pH range of 3.5-6, deprotonation of additives (such as sulphonated initiator and emulsifier) begins as the methacrylic acid is fully protonated. At a pH of greater than 6 and up to 9, deprotonation of the methacrylic acid begins and results in a relatively increased negative surface charge. At a pH of 9, there is a sudden increase in negative surface change, indicative of complete deprotonation. At a pH of greater than 9, there is a slight increase in negative surface charge due to the presence of greater ionic strength in the aqueous phase. The pH of the example polymer of FIG. 2A (pH 6.5) was less than the pH of the example polymer of FIG. 2B (pH 9.7). Therefore, the example polymer of FIG. 2B exhibited a greater level of deprotonation in comparison to the example polymer of FIG. 2A. In order to confirm the greater anionic charge due to the higher pH and higher deprotonation of the example polymer of FIG. 2B, zeta potential measurements were conducted. The results of the zeta potential measurements are summarized in Table 2. As shown in Table 2, the zeta potential of the example polymer of FIG. 2B was greater than the zeta potential of the example polymer of FIG. 2A, which confirms the pH readings.

TABLE 2

Zeta potential measurements for example polymers of FIGS. 2A and 2B

| Test Number | Polymer 2A | Polymer 2B |
| --- | --- | --- |
| 1 | −26.31 | −41.23 |
| 2 | −25.08 | −40.27 |
| 3 | −20.6 | −36.33 |
| 4 | −20.08 | −32.29 |
| 5 | −19.74 | −33.13 |

Figure 3A:
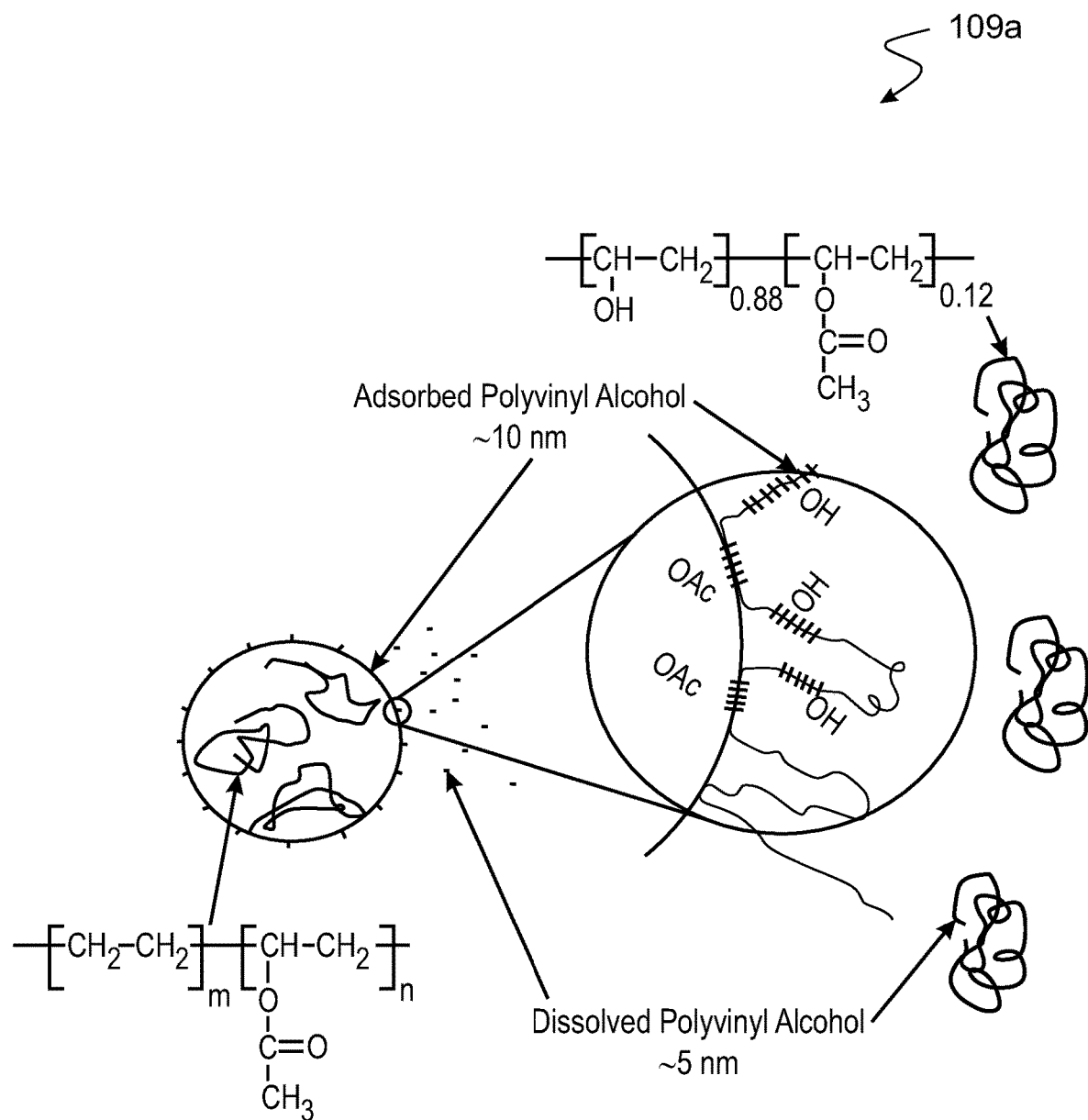
FIG. 3A is a schematic diagram of an example polymer that can be included in a latex for a drilling fluid.

FIG. 3A is a schematic diagram of an example polymer that can be included in a latex for a drilling fluid. The example polymer shown in FIG. 3A is an implementation of the first polymer 109a including polyvinyl acetate and polyvinyl alcohol. The example polymer shown in FIG. 3A can be polyvinyl acetate that has been partially hydrolyzed, such that at least a portion of the acyl groups (R—C═O) and/or alkoxy groups (R—O) have been converted to alcohol groups (R—OH). The presence of hydroxyl groups (—OH) in the first polymer 109a allows for adequate mixing and sufficient hydrogen bonding in the drilling fluid 109 for appropriate fluid loss control. Calcium hydroxide (lime) can be used to partially hydrolyze the polyvinyl acetate. In base-catalyzed hydrolysis, electron-withdrawing substituents in acyl groups and/or alkoxy groups facilitate the hydrolysis.

Figure 3B:
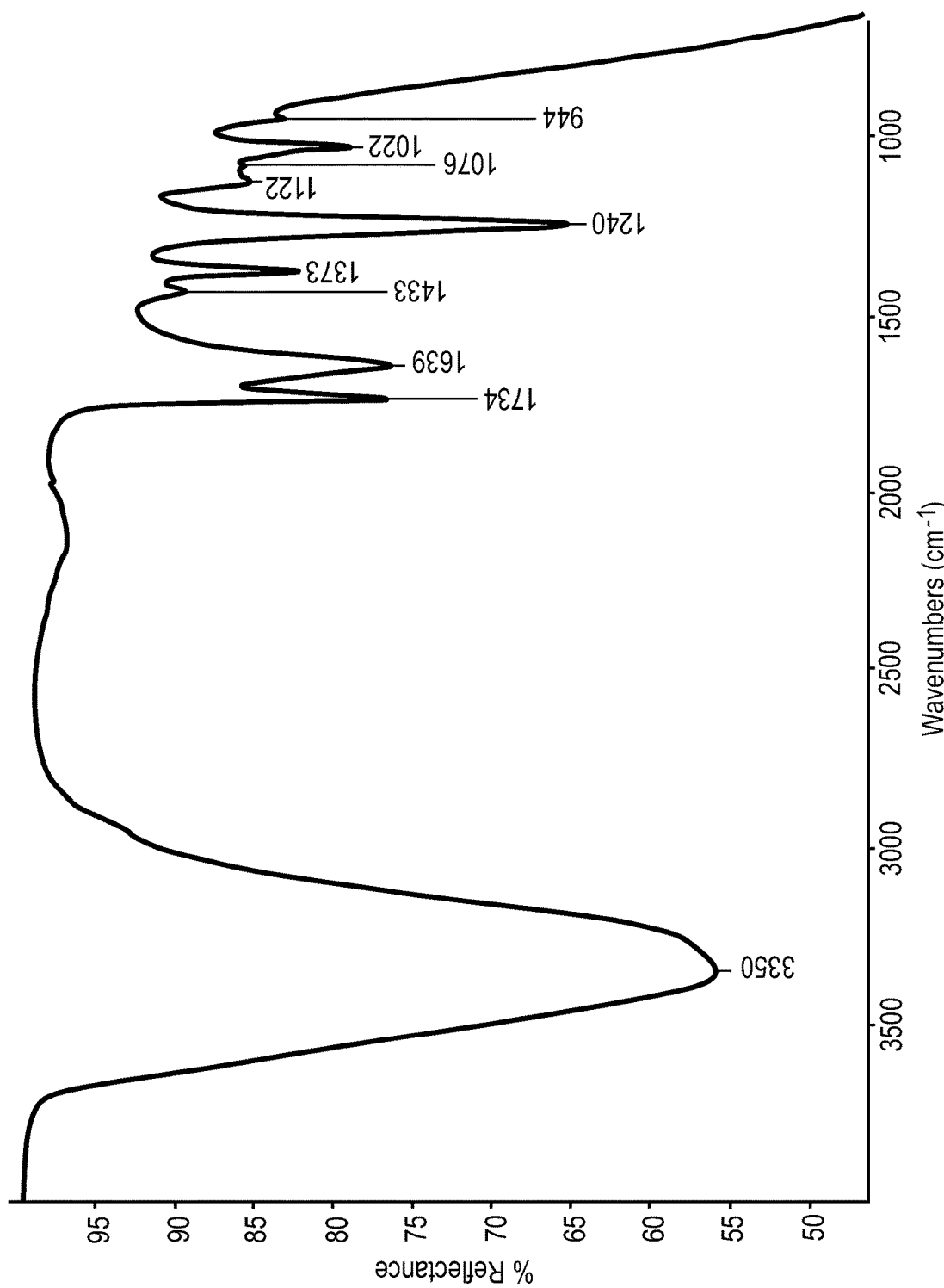
FIG. 3B is an infrared spectrum of an example polymer that can be included in a latex for a drilling fluid, prior to hydrolysis.
Figure 3C:
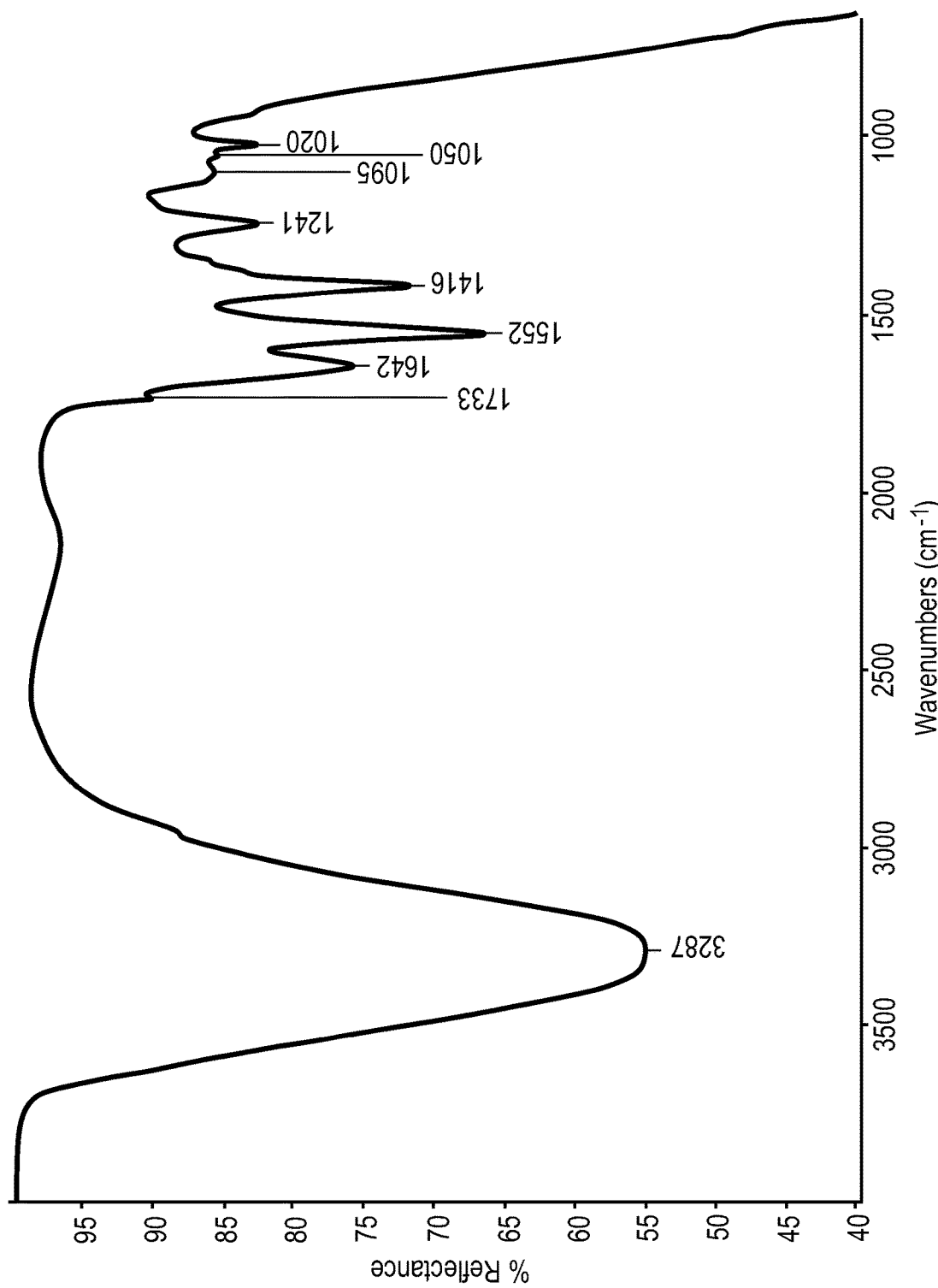
FIG. 3C is an infrared spectrum of an example polymer that can be included in a latex for a drilling fluid, following hydrolysis.

FIG. 3B is an infrared spectrum of an implementation of the first polymer 109a prior to hydrolysis. FIG. 3C is an infrared spectrum of an implementation of the first polymer 109a after hydrolysis. The infrared spectra (in percent reflectance) shown in FIGS. 3B and 3C were also obtained using the Varian FTIR spectrophotometer. The infrared spectra shown in FIGS. 3B and 3C show an increase in width of the hydroxyl group peak from before hydrolysis (FIG. 3B) to after hydrolysis (FIG. 3C), indicating an increase in the conversion of acetate into alcohol. In turn, the infrared spectra shown in FIGS. 3B and 3C also show a decrease in the acetate peak from before hydrolysis (FIG. 3B) to after hydrolysis (FIG. 3C), which affirms the conversion of acetate into alcohol as a result of the hydrolysis.

Various example drilling fluids with varying quantities of latex were tested by performing shale dispersion tests. The shale dispersion tests included taking 20 grams of representative shale cuttings and immersing the cuttings in the respective drilling fluid and underwent hot rolling at a temperature of 200 degrees Fahrenheit (° F.) for 16 hours. The cuttings were then removed from the respective drilling fluid, washed, and filtered. The quantity of cuttings that did not pass through the filter was dried at 105° C. for 24 hours, and the dried cuttings were measured and compared to the initial mass of 20 grams and recorded as a percent (%)

recovery factor. High % recovery factor was indicative of the respective drilling fluid's capability for shale inhibition. A general mineral makeup of the representative shale cuttings used in the shale dispersion tests is provided in Table 3.

TABLE 3

Generalized mineral makeup of representative shale cuttings

| Mineral | Weight Percentage (wt. %) |
|---|---|
| Quartz ($SiO_2$) | 21 |
| Microcline ($KAlSi_3O_8$) | 9 |
| Pyrite ($FeS_2$) | 1 |
| Kaolinite ($Al_2Si_2O_5(OH)_4$) | 39 |
| Chlorite $(Mg, Fe, Al)_6(Si, Al)_4O_{10}(OH)_8)$ | 7 |
| Illite ($KAl_2(Si_3Al)O_{10}(OH)_2$) | 14 |
| I/S ($KAl_4(SiAl)_8O_{10}(OH)_4 \cdot 4H_2O$) | 9 |

Table 4 provides the compositions of various example drilling fluids and various properties, such as plastic viscosity and yield point. The drilling fluids shown in Table 4 had varying quantities of the second polymer 109b (none, 10 grams, 20 grams, and 30 grams).

TABLE 4

Characteristics of drilling fluids with varying quantities of polymer-based latex

| Additive Name | Drilling Fluid 1 | Drilling Fluid 2 | Drilling Fluid 3 | Drilling Fluid 4 | Mixing Time |
|---|---|---|---|---|---|
| | Quantity (grams) | | | | Minutes |
| Water | 294 | 294 | 294 | 294 | 0 |
| Soda Ash | 0.5 | 0.5 | 0.5 | 0.5 | 5 |
| X-Polymer | 1 | 1 | 1 | 1 | 20 |
| Pack-L | 1 | 1 | 1 | 1 | 20 |
| Starch | 3 | 3 | 3 | 3 | 20 |
| New Drill Plus | 1 | 1 | 1 | 1 | 20 |
| Styrene-butadiene latex (second polymer 109b) | 0 | 10 | 20 | 30 | 20 |
| NaCl | 50 | 50 | 50 | 50 | 5 |
| Calcium Carbonate-Fine | 15 | 15 | 15 | 15 | 5 |
| Calcium Carbonate-Medium | 15 | 15 | 15 | 15 | 5 |
| Barite | 17 | 17 | 17 | 17 | 5 |
| Caustic Soda | 0.5 | 0.5 | 0.5 | 0.5 | 5 |
| $Na_2S$ | 1 | 1 | 1 | 1 | 5 |

Hot rolling at 200° F., 500 psig for 16 hours

| Property | | | | | unit |
|---|---|---|---|---|---|
| RPM 600 | 60 | 67 | 65 | 57 | RPM |
| RPM 300 | 45 | 43 | 45 | 39 | |
| RPM 200 | 34 | 35 | 37 | 32 | |
| RPM 100 | 23 | 24 | 26 | 22 | |
| RPM 6 | 6 | 7 | 8 | 7 | |
| RPM 3 | 4 | 4 | 5 | 5 | |
| PV | 15 | 24 | 20 | 18 | cP |
| YP | 30 | 19 | 25 | 21 | lb/100 ft² |
| Gel Strength 10 s | 6 | 7 | 7 | 6 | |
| Gel Strength 10 m | 14 | 9 | 9 | 11 | |
| pH | 11.3 | 11.2 | 11.2 | 11.2 | |
| Density | 69 | 69 | 69 | 69 | lb/ft³ |
| Fluid Loss | 1.5 | 5 | 1 | 0 | mL |
| Shale Recovery | 60.25 | 68.85 | | | % |

Figure 4A:
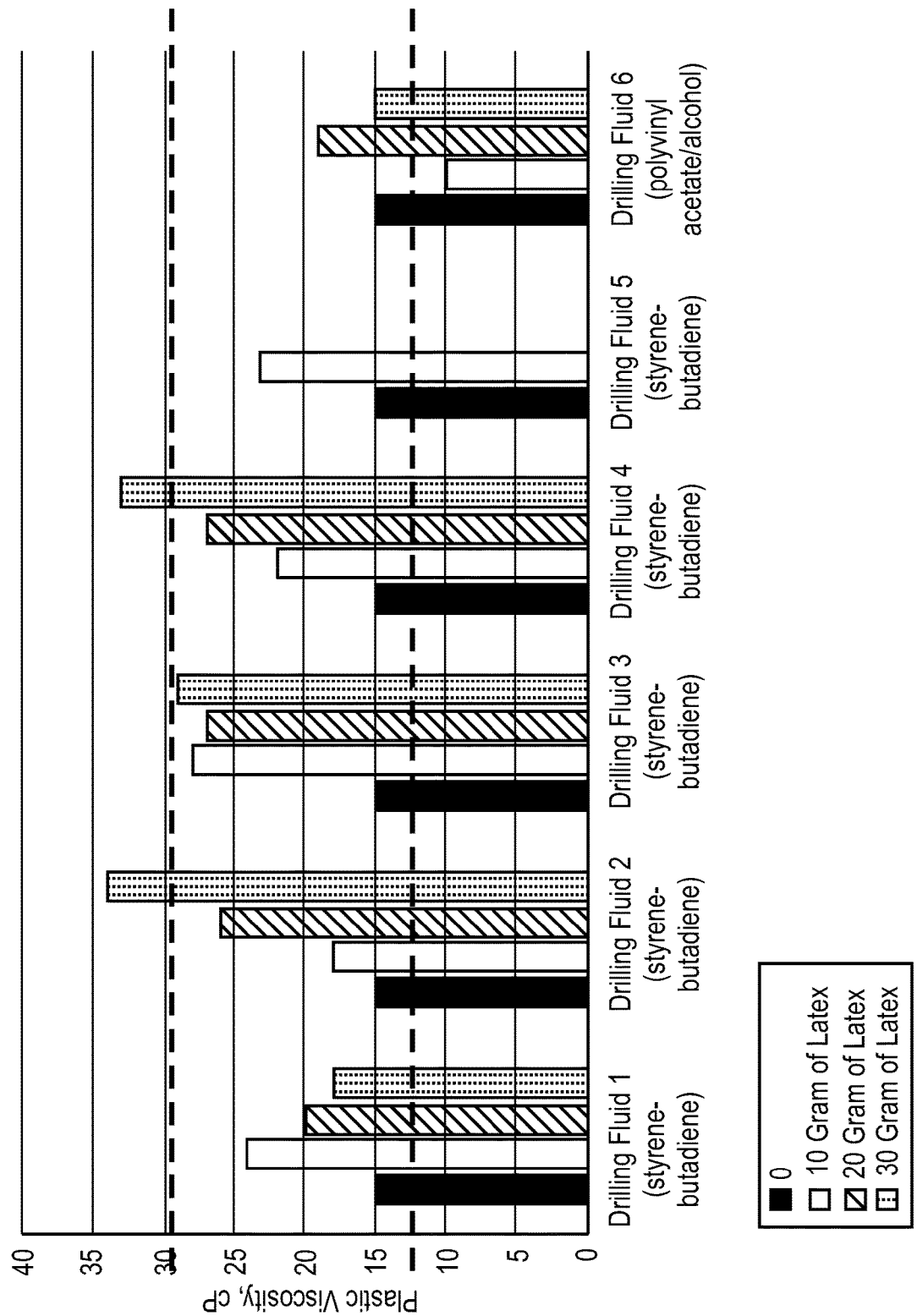
FIG. 4A is a bar graph showing viscosities of various example drilling fluids including various quantities of latex.

FIG. 4A is a bar graph showing plastic viscosities of various example drilling fluids including various quantities of the polymer-based latex (for example, the first polymer 109a, the second polymer 109b, or a mixture of both). The zone between the dotted lines is considered a suitable range of plastic viscosities for the function of a drilling fluid. Including between 10 and 20 grams of the polymer-based latex provided suitable plastic viscosities for the function of a drilling fluid.

Figure 4B:
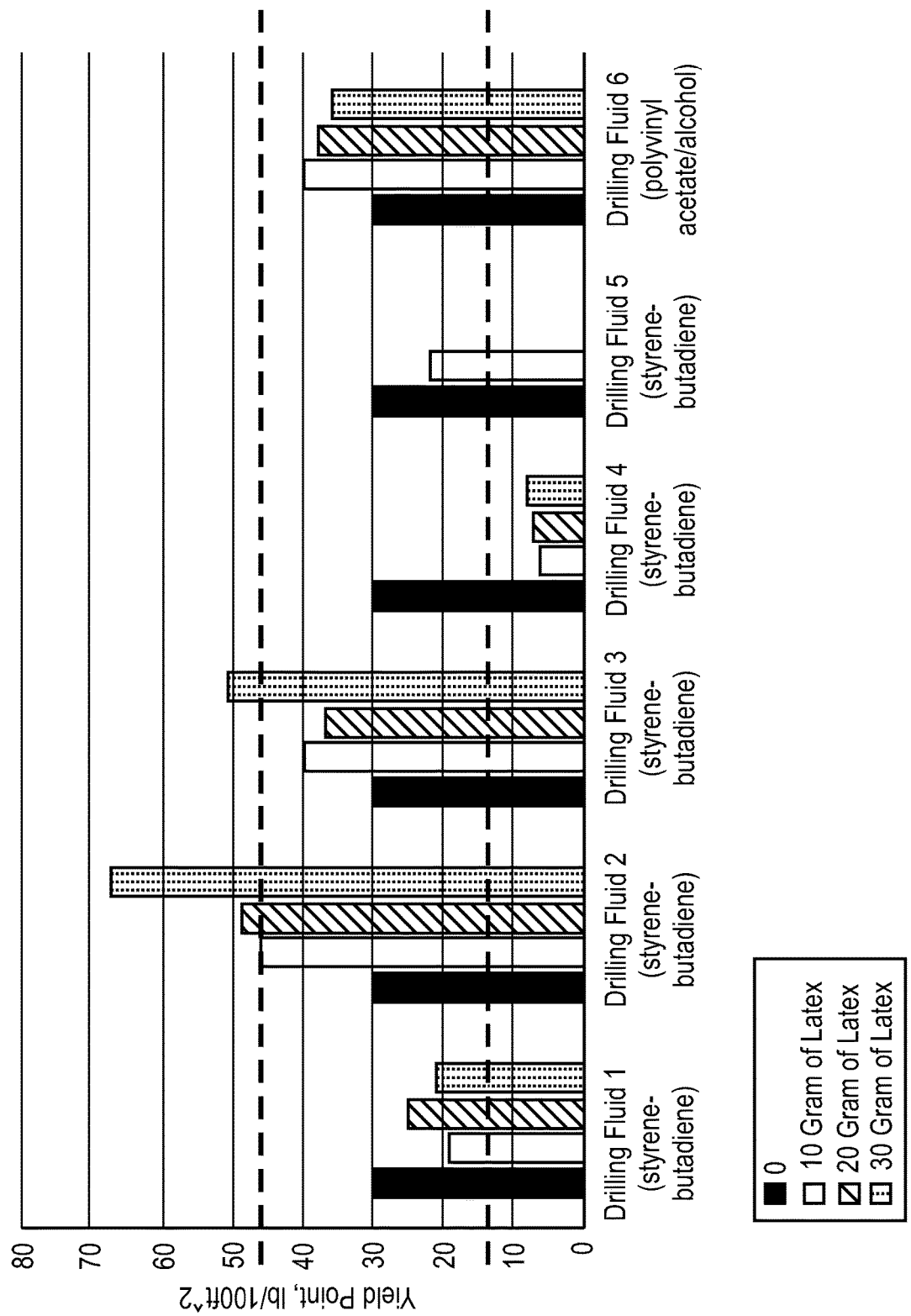
FIG. 4B is a bar graph showing yield points of various example drilling fluids including various quantities of latex.

FIG. 4B is a bar graph showing yield points of various example drilling fluids including various quantities of the polymer-based latex (for example, the first polymer 109a, the second polymer 109b, or a mixture of both). The zone between the dotted lines is considered a suitable range of yield points for the function of a drilling fluid. Including up to 20 grams of the polymer-based latex provided suitable yield points for the function of a drilling fluid.

Figure 4C:
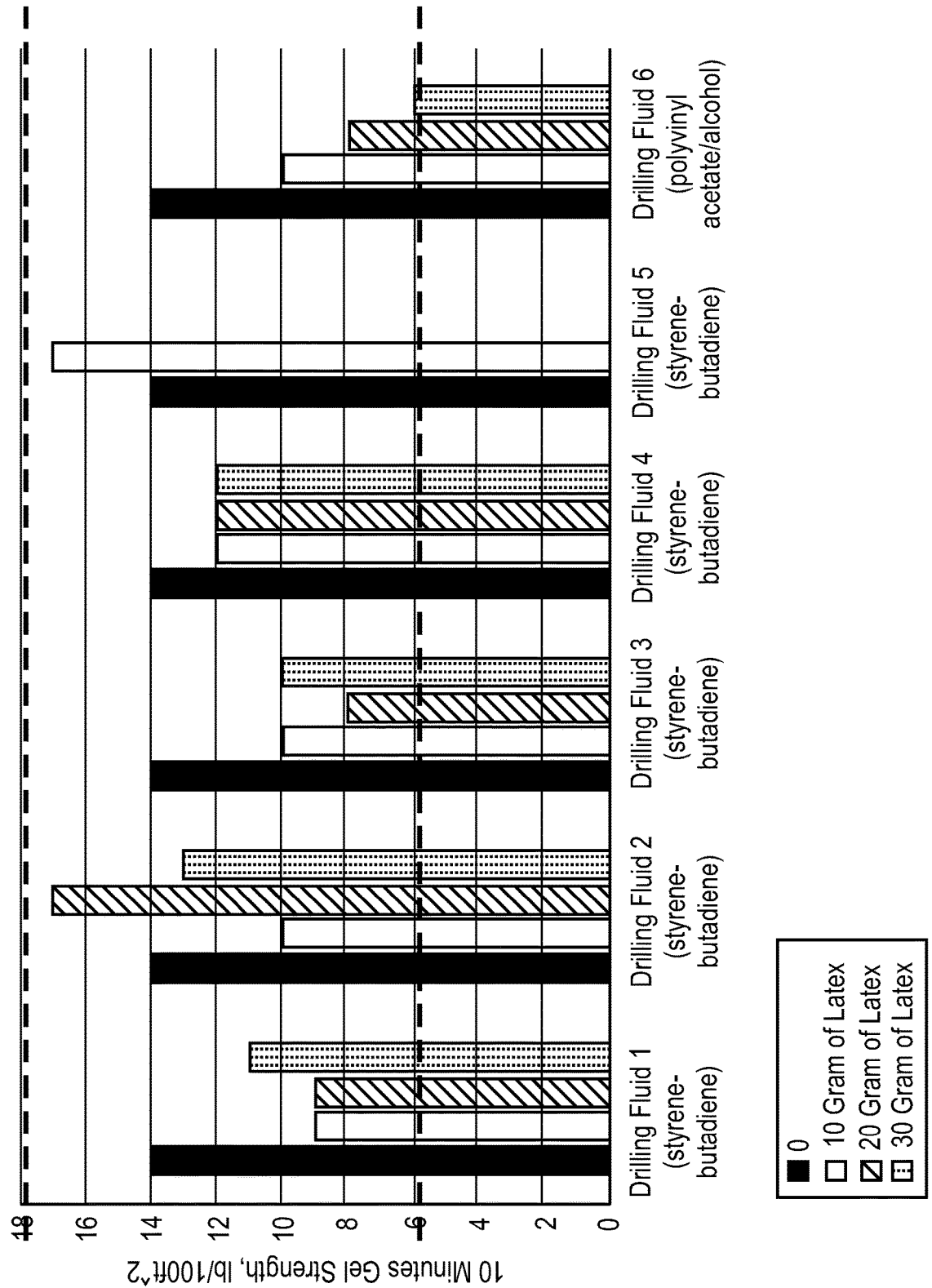
FIG. 4C is a bar graph showing gel strengths of various example drilling fluids including various quantities of latex.

FIG. 4C is a bar graph showing gel strengths of various example drilling fluids including various quantities of the polymer-based latex (for example, the first polymer 109a, the second polymer 109b, or a mixture of both). The zone between the dotted lines is considered a suitable range of gel strengths for the function of a drilling fluid. Including up to 20 grams of the polymer-based latex provided suitable gel strengths for the function of a drilling fluid.

Figure 4D:
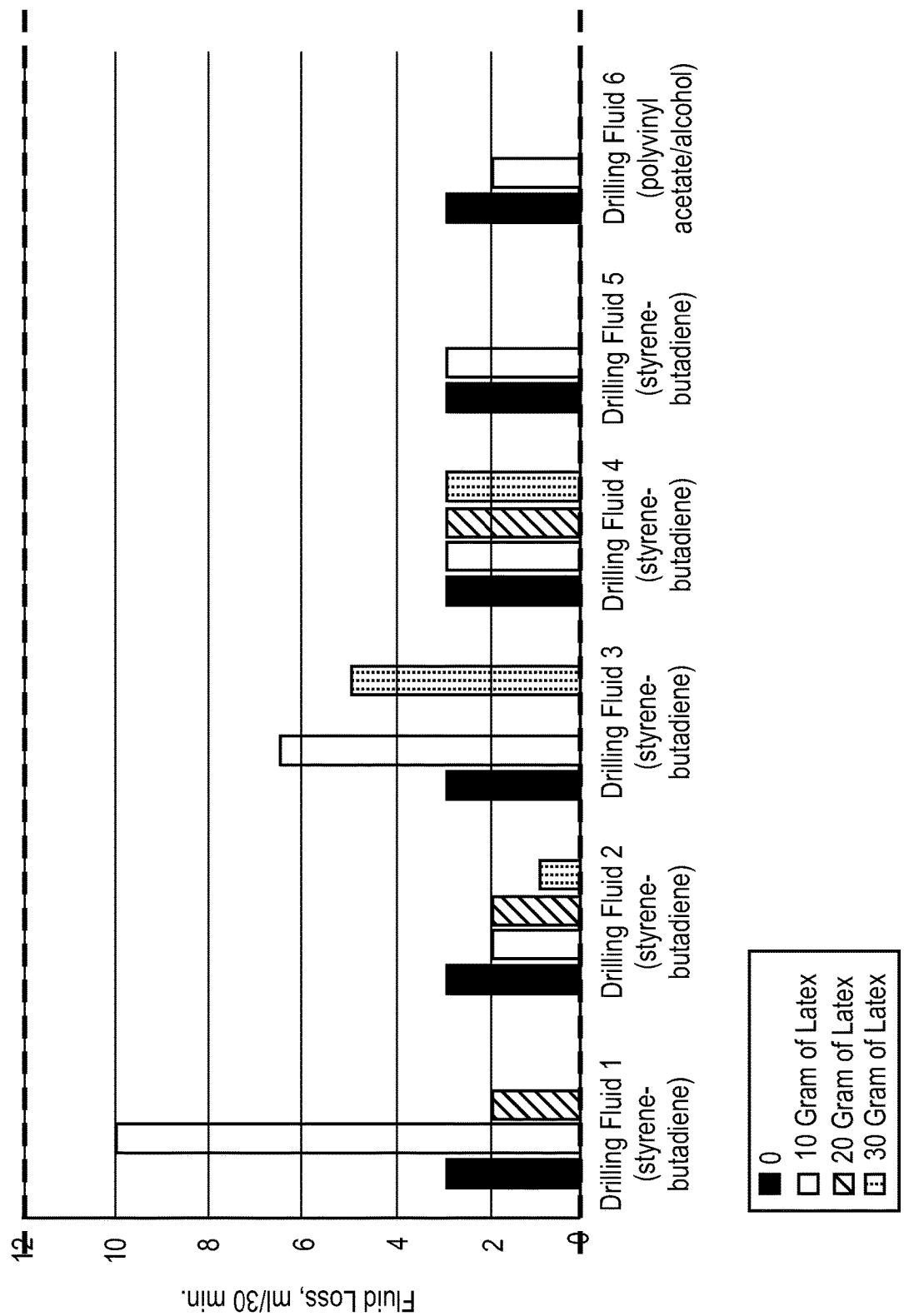
FIG. 4D is a bar graph showing fluid losses of various example drilling fluids including various quantities of latex.

FIG. 4D is a bar graph showing fluid loss control of various example drilling fluids including various quantities of the polymer-based latex (for example, the first polymer 109a, the second polymer 109b, or a mixture of both). The zone between the dotted lines is considered a suitable range of fluid loss control for the function of a drilling fluid. All example drilling fluids provided suitable fluid loss control for the function of a drilling fluid.

Figure 4E:
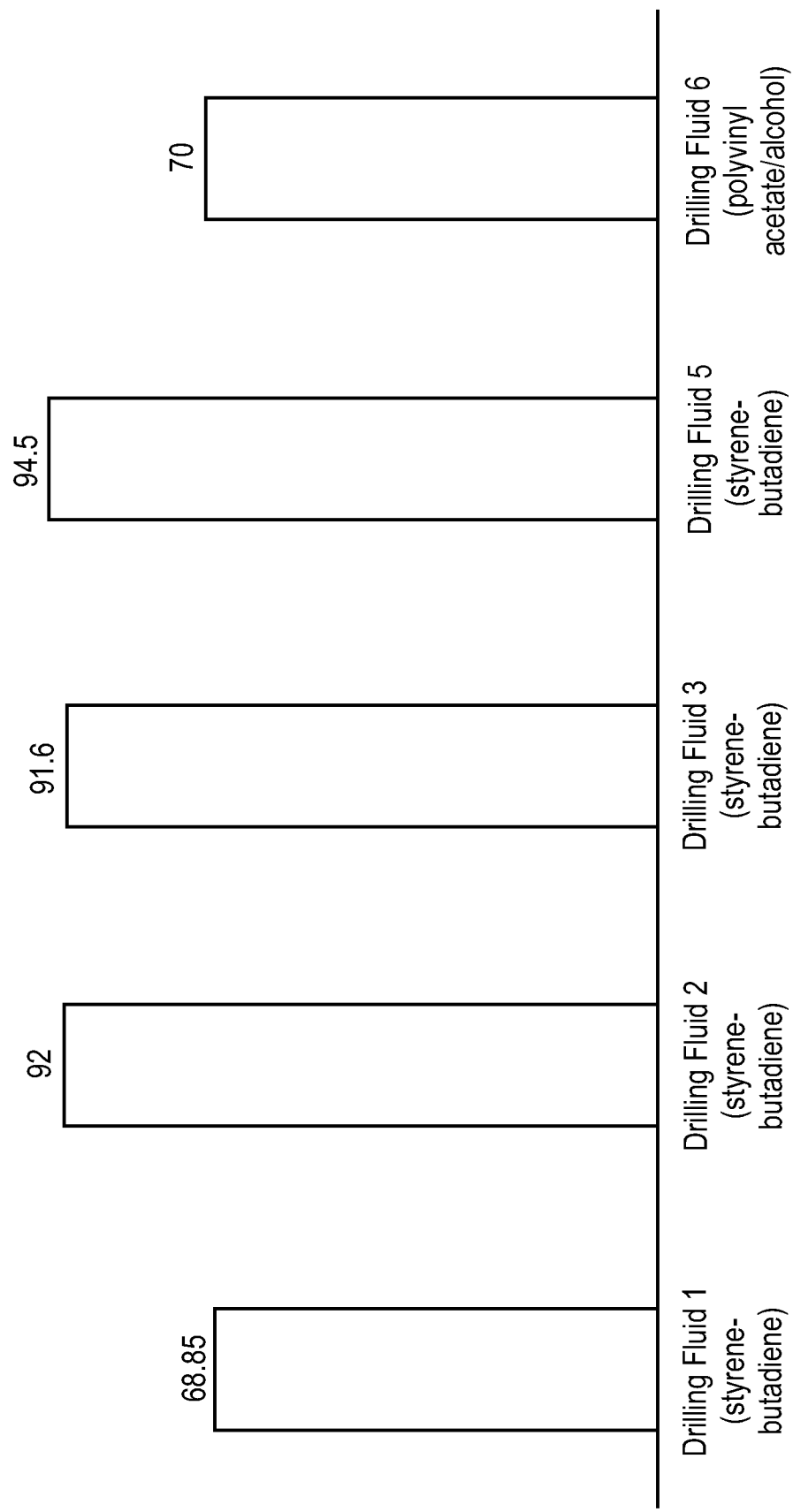
FIG. 4E is a bar graph showing shale dispersion recoveries of various example drilling fluids including various quantities of latex.

FIG. 4E is a bar graph showing shale dispersion % recoveries of various example drilling fluids including various quantities of the polymer-based latex (for example, the first polymer 109a, the second polymer 109b, or a mixture of both). The zone between the dotted lines is considered a suitable range of shale dispersion % recoveries for the function of a drilling fluid. The greatest % recovery (94.5%) was obtained with an implementation of the second polymer 109b (styrene-butadiene latex). The second greatest % recovery (92%) was obtained with another implementation of the second polymer 109b (styrene-butadiene latex). An implementation of the first polymer 109a (polyvinyl acetate-polyvinyl alcohol latex) obtained a 70% recovery.

Figure 4F:
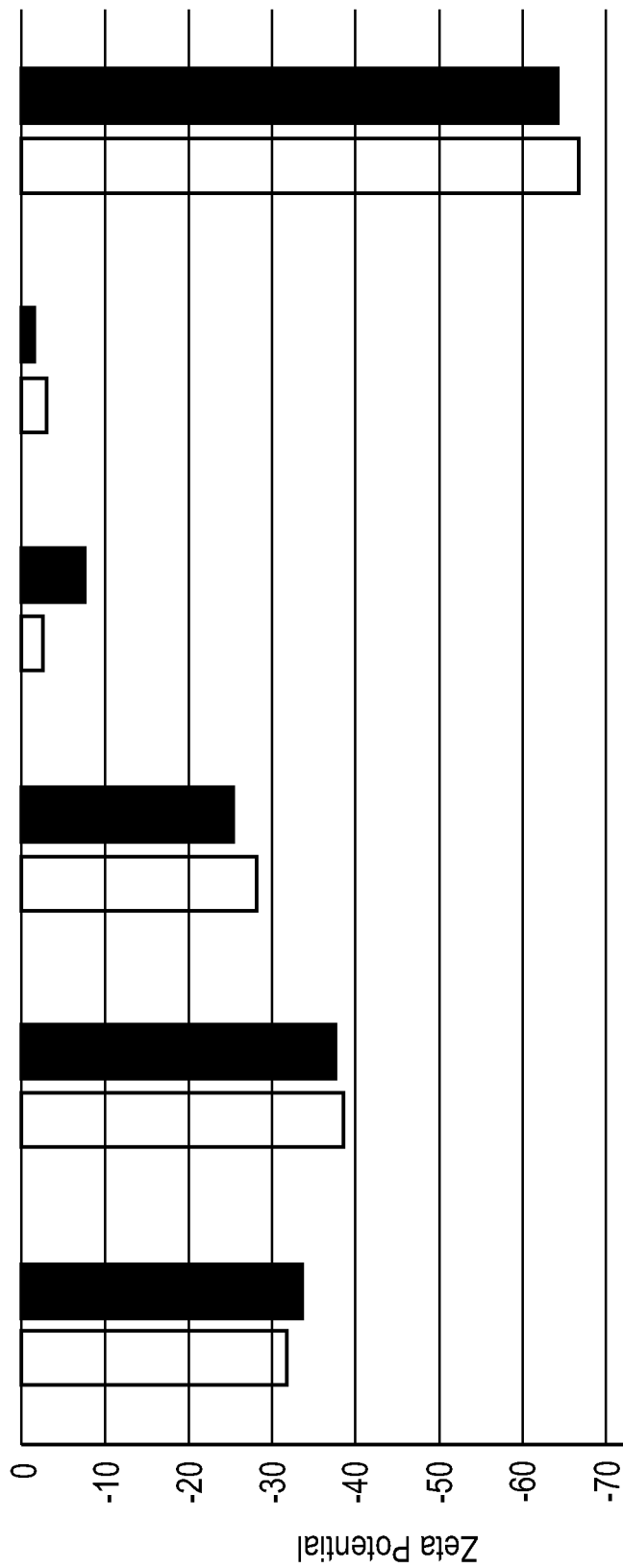
FIG. 4F is a bar graph showing zeta potentials of various example drilling fluids including various quantities of latex.

FIG. 4F is a bar graph showing zeta potentials of various example drilling fluids including various quantities of the polymer-based latex (for example, the first polymer 109a, the second polymer 109b, or a mixture of both). The largest negative charge values were exhibited by an implementation of the second polymer 109b (styrene-butadiene latex).

Figure 4G:
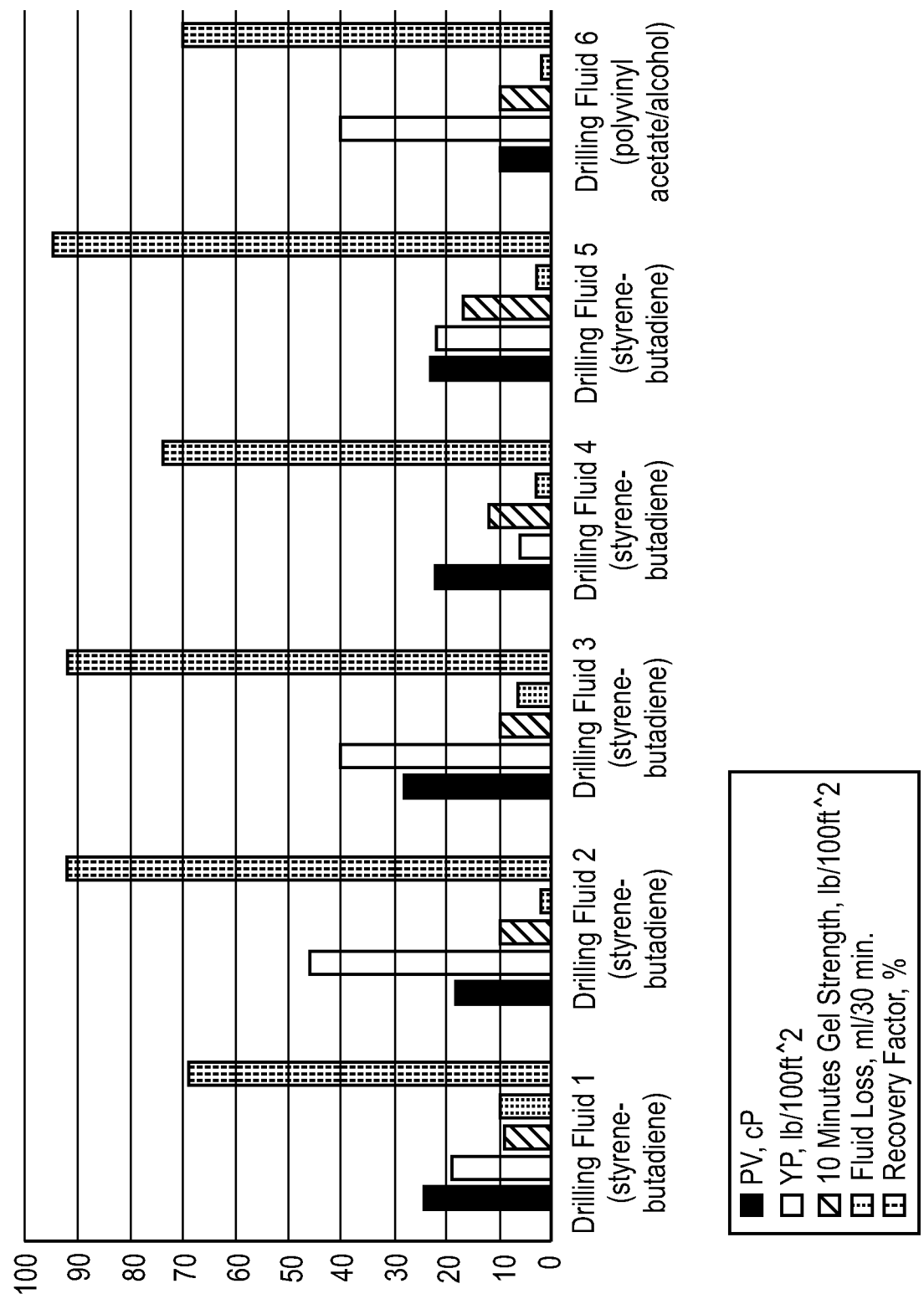
FIG. 4G is a bar graph showing various properties of various example drilling fluids.

FIG. 4G is a bar graph showing various properties (plastic viscosity, yield point, gel strength, fluid loss control, shale dispersion % recovery) of various example drilling fluids including the polymer-based latex (for example, the first polymer 109a, the second polymer 109b, or a mixture of both). The polymer-based latex quantity for each of the drilling fluids was set at 10 grams.

Figure 5:
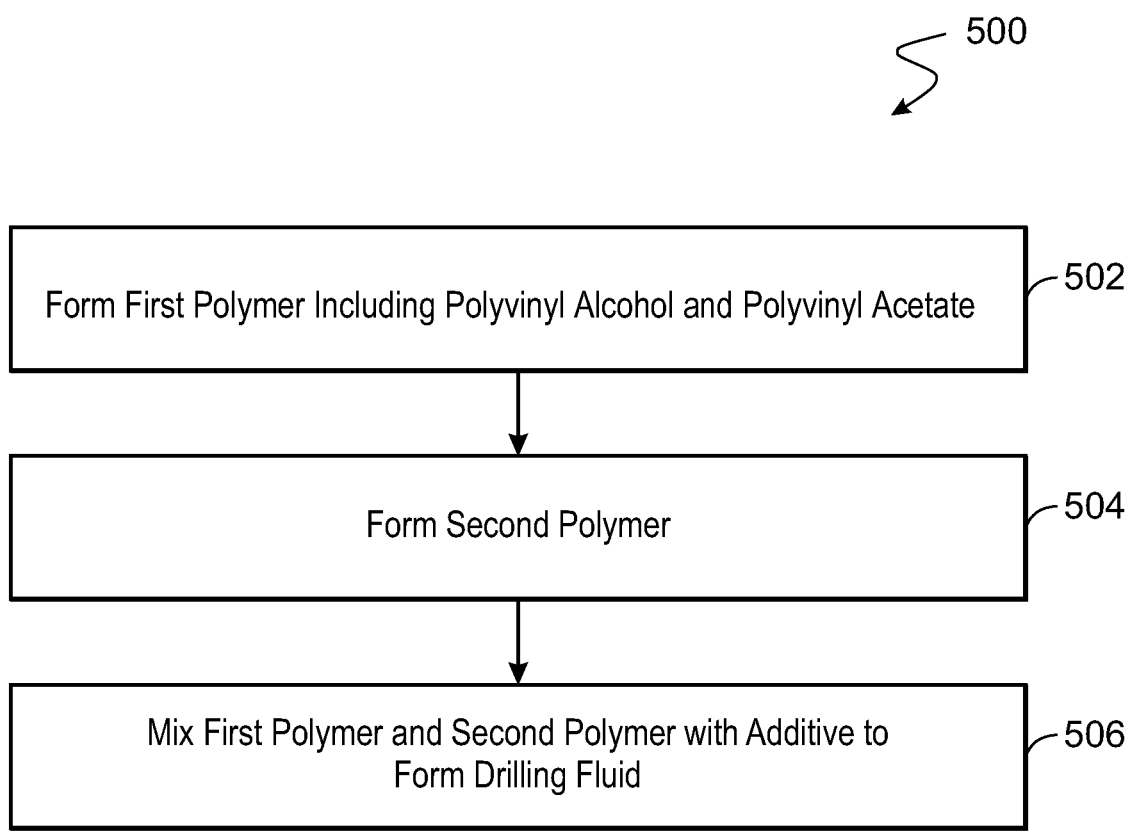
FIG. 5 is a flow chart of an example method of forming a drilling fluid that includes a polymer-based latex.

FIG. 5 is a flow chart of an example method 500 of forming a drilling fluid that includes a polymer-based latex, such as the drilling fluid 109 including the first polymer 109a, the second polymer 109b, or a mixture of both. At block 502, a first polymer (such as the first polymer 109a) is formed. The first polymer 109a formed at block 502 includes polyvinyl alcohol and polyvinyl acetate. Forming the first polymer 109a at block 502 includes mixing calcium hydroxide and water to form a first mixture. Forming the first polymer 109a at block 502 includes adding polyvinyl acetate to the first mixture to form a second mixture. Forming the first polymer 109a at block 502 includes stirring the second mixture for a first specified time duration sufficient to hydrolyze at least a portion of the polyvinyl acetate into polyvinyl alcohol and form the first polymer 109a. A molar concentration of the polyvinyl alcohol in the first polymer 109a formed at block 502 is greater than 80% and less than 100% (for example, in a range of from about 80% to about 90%, from about 85% to about 95%, or from about 85% to about 90%). In some implementations, the first specified time duration is about 5 minutes. At block 504, a second polymer (such as the second polymer 109b) is formed. Forming the second polymer 109b at block 504 includes mixing citric acid and water to form a third mixture. Forming the second polymer 109b at block 504 includes adding a styrene-butadiene polymer to the third mixture to form a fourth mixture. Forming the second polymer 109b at block 504 includes stirring the fourth mixture for a second specified time duration sufficient for carboxylation of the styrene-butadiene to occur and form the second polymer 109b. In some implementations, the second specified time duration is about 5 minutes. The second polymer 109b formed at block 504 has the following general structure:

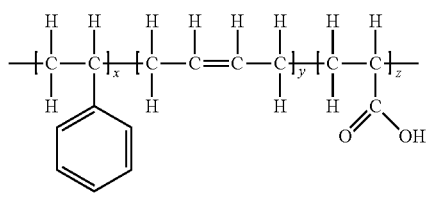

where x is an overall molar ratio of styrene in the second polymer 109b, y is an overall molar ratio of butadiene in the second polymer 109b, and z is an overall molar ratio of carboxylic acid in the second polymer 109b. A sum of x, y, and z can be represented as s. In some implementations, x (styrene) is in a range of from about 20% to about 30% of s. In some implementations, y (butadiene) is in a range of from about 70% to about 80% of s. In some implementations, z (carboxylic acid) is in a range of from about 1% to about 5% of s. In some implementations, a ratio of x (styrene) toy (butadiene) in the second polymer 109b is in a range of from about 0.22:1 to about 1:0.22. At block 506, the first polymer 109a (formed at block 502) and the second polymer 109b (formed at block 504) are mixed with an additive to form a drilling fluid (such as the drilling fluid 109). In some implementations, the additive mixed with the first polymer 109a and the second polymer 109b at block 506 to form the drilling fluid 109 includes at least one of soda ash, xanthan gum, a cellulosic polymer, a starch, a hydrolyzed polyacrylamide polymer, a salt, a sulfate mineral, caustic soda, or sodium sulfide. In some implementations, a molar ratio of the first polymer 109a to the second polymer 109b in the drilling fluid 109 formed at block 506 is in a range of from about 1:2 to about 2:1. For example, the molar ratio of the first polymer 109a to the second polymer 109b in the drilling fluid 109 formed at block 506 is about 1:1. In some implementations, a combined concentration of the first polymer 109a and the second polymer 109b in the drilling fluid 109 formed at block 506 is in a range of from about 0.1 volume percent (vol. %) to about 10 vol. %. For example, the combined concentration of the first polymer 109a and the second polymer 109b in the drilling fluid 109 formed at block 506 can be in a range of from about 2.4 vol. % to about 4.8 vol. %.

Figure 6:
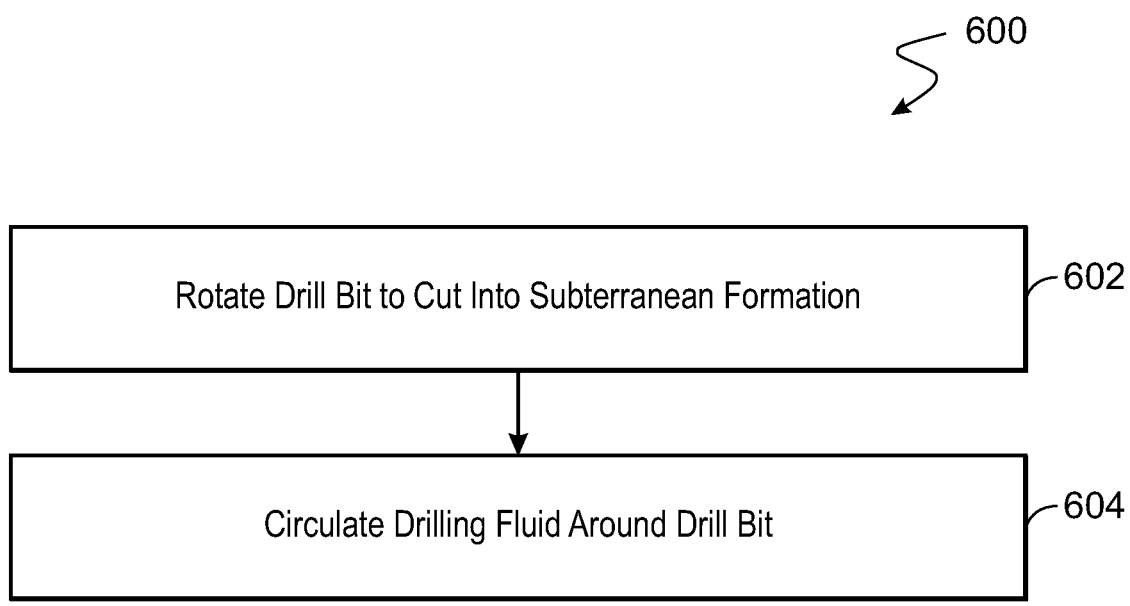
FIG. 6 is a flow chart of an example method of drilling a wellbore in a subterranean formation.

FIG. 6 is a flow chart of an example method 600 of drilling a wellbore in a subterranean formation. As an example, the rig system 100 can be used to implement the method 600. At block 602, a drill bit (for example, a drill bit that is a part of the drill string assembly 106 of rig system 100) is rotated to cut into a subterranean formation. Rotating the drill bit to cut into the subterranean formation at block 602 forms a wellbore in the subterranean formation. At block 604, a drilling fluid (such as the drilling fluid 109) is circulated around the drill bit and through the wellbore as the drill bit rotates at block 602. As mentioned previously, the drilling fluid 109 includes a latex. The latex can include a first polymer (such as the first polymer 109a), a second polymer (such as the second polymer 109b), or a mixture of both. The first polymer 109a includes polyvinyl alcohol and polyvinyl acetate. In some implementations, a molar concentration of the polyvinyl alcohol in the first polymer 109a is greater than 80% and less than 100% (for example, in a range of from about 80% to about 90%, from about 85% to about 95%, or from about 85% to about 90%). The second polymer 109b is derived from styrene, butadiene, and a carboxylic acid. The second polymer 109b has the following general structure:

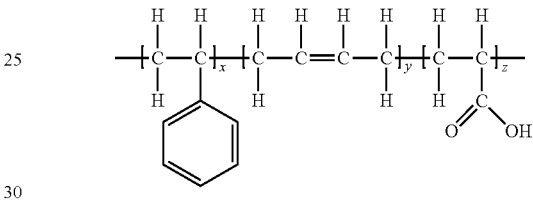

where x is an overall molar ratio of styrene in the second polymer 109b, y is an overall molar ratio of butadiene in the second polymer 109b, and z is an overall molar ratio of carboxylic acid in the second polymer 109b. A sum of x, y, and z can be represented as s. In some implementations, x (styrene) is in a range of from about 20% to about 30% of s. In some implementations, y (butadiene) is in a range of from about 70% to about 80% of s. In some implementations, z (carboxylic acid) is in a range of from about 1% to about 5% of s. In some implementations, a ratio of x (styrene) toy (butadiene) in the second polymer 109b is in a range of from about 0.22:1 to about 1:0.22. In some implementations, the drilling fluid 109 circulated around the drill bit and through the wellbore at block 604 includes an additive that includes at least one of soda ash, xanthan gum, a cellulosic polymer, a starch, a hydrolyzed polyacrylamide polymer, a salt, a sulfate mineral, caustic soda, or sodium sulfide. In some implementations, a molar ratio of the first polymer 109a to the second polymer 109b in the drilling fluid 109 is in a range of from about 1:2 to about 2:1. For example, the molar ratio of the first polymer 109a to the second polymer 109b in the drilling fluid 109 is about 1:1. In some implementations, a combined concentration of the first polymer 109a and the second polymer 109b in the drilling fluid 109 is in a range of from about 0.1 volume percent (vol. %) to about 10 vol. %. For example, the combined concentration of the first polymer 109a and the second polymer 109b in the drilling fluid 109 can be in a range of from about 2.4 vol. % to about 4.8 vol. %.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A drilling fluid composition comprising:
   a latex comprising a first polymer and a second polymer dispersed in water, wherein:
   a molar ratio of the first polymer to the second polymer in the drilling fluid composition is about 1:1;
   the first polymer comprises polyvinyl alcohol and polyvinyl acetate, wherein a molar concentration of the polyvinyl alcohol in the first polymer is greater than 80% and less than 100%; and
   the second polymer is derived from styrene, butadiene, and a carboxylic acid and has the general structure:

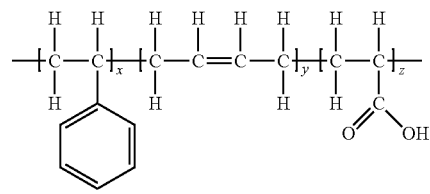

wherein:
   a sum of x, y, and z is equal to s,
   x is in a range of from about 20% to about 30% of s,
   y is in a range of from about 70% to about 80% of s, and
   z is in a range of from about 1% to about 5% of s.

2. The drilling fluid composition of claim 1, comprising an additive comprising at least one of soda ash, xanthan gum, a cellulosic polymer, a starch, a hydrolyzed polyacrylamide polymer, a salt, a sulfate mineral, caustic soda, or sodium sulfide.

3. The drilling fluid composition of claim 2, wherein a combined concentration of the first polymer and the second polymer in the drilling fluid composition is in a range of from about 0.1 volume percent (vol. %) to about 10 vol. %.

4. The drilling fluid composition of claim 3, wherein the combined concentration of the first polymer and the second polymer in the drilling fluid composition is in a range of from 2.4 vol. % to 4.8 vol. %.

5. The drilling fluid composition of claim 3, wherein the molar concentration of the polyvinyl alcohol in the first polymer is about 88%.

* * * * *